US007592090B2

(12) United States Patent
Seabaugh et al.

(10) Patent No.: US 7,592,090 B2
(45) Date of Patent: *Sep. 22, 2009

(54) PEROVSKITE ELECTRODES AND METHOD OF MAKING THE SAME

(75) Inventors: Matthew M. Seabaugh, Columbus, OH (US); Scott L. Swartz, Columbus, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/231,340

(22) Filed: Sep. 20, 2005

(65) Prior Publication Data

US 2006/0177725 A1    Aug. 10, 2006

Related U.S. Application Data

(63) Continuation of application No. 10/425,191, filed on Apr. 28, 2003, now Pat. No. 6,946,213.

(51) Int. Cl.
*H01M 4/00* (2006.01)
*H01M 4/88* (2006.01)
*H01B 1/02* (2006.01)

(52) U.S. Cl. .................. 429/40; 502/101; 252/519.15

(58) Field of Classification Search .................. 429/40, 429/50; 502/101, 525; 252/519.15
See application file for complete search history.

(56) References Cited

U.S. PATENT DOCUMENTS

| | | | | |
|---|---|---|---|---|
| 5,720,864 A | * | 2/1998 | Nakagiri et al. | 204/421 |
| 6,066,585 A | * | 5/2000 | Swartz | 501/128 |
| 6,120,924 A | | 9/2000 | Chiba et al. | 429/27 |
| 6,129,862 A | * | 10/2000 | Munakata et al. | 252/519.15 |
| 6,946,213 B2 | * | 9/2005 | Seabaugh et al. | 429/40 |

FOREIGN PATENT DOCUMENTS

DE      4119498      12/1992

OTHER PUBLICATIONS

Kostogloudis el al., "Crystal structure, thermal expansion and electrical conductivity of $Pr_{1-x}Sr_xCo_{0.2}Fe_{0.8}O_{3-\delta}$ (0 < X < 0.5)", *Solid State Ionics* 135 ( 2000) 537-541.
Kostogloudis et al., "The Perovskite Oxide System $Pr_{1-x}Sr_xCo_{1-y}Mn_yO_{3-\delta}$ : Crystal Structure and Thermal Expansion," *J. Eur. Cer. Soc.* 18 (1998) 2209-2215.
Kostogloudis et al., "Electronic conductivity in the $Pr_{1-x}Sr_xCo_{1-y}Mn_yO_{3-\delta}$ system,," *Solid State Ionics* 118 (1999) 241-249.
Huang et al., "Properties of nonstoichiometric $Pr_{0.6-x}Sr_{0.4}MnO_3$ as the cathodes of SOFCs," *Solid State Ionics* 130 (2000) 195-201.
Kostogloudis et al., "Chemical compatibility of alternative perovskite oxide SOFC cathodes with doped lanthanum gallate solid electrolyte," *Solid State Ionics* 134 (2000) 127-138.
Kharton et al., "Research on the electrochemistry of oxygen ion conductors in the former Soviet Union. II. Perovskite-related oxides," *J. Solid State Electrochem.* 3 (1999) 303-326.
Saracco et al., "Methane combustion on Mg-doped $LaMnO_3$ perovskite catalysts," *Applied Catalysis B: Environmental* 20 (1999) 277-288.
Huang et al., "Sr- and Ni- Doped $LaCoO_3$ and $LaFeO_3$ Perovskites," *J. Electrochem. Soc.* 145 (1998) 3220-3227.
Chiba et al., "An investigation of $LaNi_{1-x}Fe_xO_3$ as a cathode material for solid oxide fuel cells," *Solid State Ionics* 124 (1999) 281-288.
Teraoka et al., "Effect of Cation Substitution on the Oxygen Semipermeability of Perovskite-type Oxides," *Chem. Letters* (1988) 503-506.
Dann et al., "The Effect of Oxygen Stoichiometry on Phase Relations and Structure in the System $La_{1-x}Sr_xFeO_{3-\delta}$ (0 < X < 1, 0 < δ < 0.5)," *J. Solid State Chem.* 109 (1994) 134-144.
Kharton et al., "Oxygen Permeability of $LaFe_{1-x}Ni_xO_{3-\delta}$ Solid Solutions," *Materials Res. Bull.* 34 (1999) 1311-1317.
Kim et al., "Oxygen permeation, electrical conductivity and stability of the perovskite oxide $La_{0.2}Sr_{0.8}Cu_{0.4}Co_{0.6}O_{3-x}$," *Solid State Ionics* 104 (1997) 57-65.
Shaw et al., "Mixed cobalt and nickel containing perovskite oxide for intermediate temperature electrochemical applications," *Solid State Ionics* 135 (2000) 765-769.
Kaus et al., "Electrical and thermal properties of $La_{0.2}Sr_{0.8}Cu_{0.1}Fe_{0.9}O_{3-\delta}$ and of $La_{0.2}Sr_{0.8}Cu_{0.2}Fe_{0.8}O_{3-\delta}$," *Solid State Ionics* 129 (2000) 189-200.
Kao et al., "Preparation and characterisation of lanthanum nickel strontium oxides by combined coprecipitation and molten salt reactions," *Cer. Int'l* 26 (2000) 237-243.
Genouel et al., "On the Cubic Perovskites $La_{0.2}Sr_{0.8}Cu_{0.4}M_{0.6}O_{3-y}$ (M = Co, Fe)," *J. Solid State Chem.* 119 (2) 260-270.
Tikhonovich et al.," Surface modification of La ($Sr)MnO_3$ electrodes," *Solid State Ionics* 106 (1998) 197-206.
Hrovat et al., "Characterisation of $LaNi_{1-x}Co_xO_3$ as a possible SOFC cathode material," *Solid State Ionics* 83 (1996) 99-105.
Buciuman et al., "Catalytic properties of $La_{0.8}A_{0.2}MnO_3$ (A = Sr, Ba, K, Cs) and $LaMn_{0.8}B_{0.2}O_3$ (B = Ni, Zn, Cu) perovskites 1. Oxidation of hydrogen and propene," *Applied Catalysis B: Environmental* 35 (2002) 175-183.
Kharton et al., "Surface modification of $La_{0.3}Sr_{0.7}CoO_{3-\delta}$ ceramic membranes," *J. Membrane Sci.* 195 (2002) 277-287.
Vaughey et al., "Altering the Equilibrium Condition in Sr- Doped Lanthanum Manganite," *Electrochem. Soc. Proc.* 99-19 (1999) 361-369.

* cited by examiner

*Primary Examiner*—Patrick Ryan
*Assistant Examiner*—Thomas H. Parsons
(74) *Attorney, Agent, or Firm*—Porter Wright Morris & Arthur LLP

(57) ABSTRACT

The invention relates to perovskite oxide electrode materials in which one or more of the elements Mg, Ni, Cu, and Zn are present as minority components that enhance electrochemical performance, as well as electrode products with these compositions and methods of making the electrode materials. Such electrodes are useful in electrochemical system applications such as solid oxide fuel cells, ceramic oxygen generation systems, gas sensors, ceramic membrane reactors, and ceramic electrochemical gas separation systems.

16 Claims, 17 Drawing Sheets

US 7,592,090 B2

PEROVSKITE ELECTRODES AND METHOD OF MAKING THE SAME

CROSS-REFERENCE TO RELATED APPLICATIONS

This is a continuation of U.S. patent application Ser. No. 10/425,191, filed Apr. 28, 2003, now U.S. Pat. No. 6,946,213, issued Sep. 20, 2005.

STATEMENT REGARDING FEDERALLY SPONSORED RESEARCH

This invention was made with government support under Contract No. DE-F2-02-01ER-83227 awarded by the United States Department of Energy. The United States Government has certain rights in this invention.

REFERENCE TO MICROFICHE APPENDIX

Not Applicable

FIELD OF THE INVENTION

The invention relates to perovskite oxide electrode materials in which one or more of the elements Mg, Ni, Cu, and Zn are present as minority components that enhance electrochemical performance, as well as electrode products with these compositions and methods of making the electrode materials. Such electrodes are useful in electrochemical system applications such as solid oxide fuel cells, ceramic oxygen generation systems, gas sensors, ceramic membrane reactors, and ceramic electrochemical gas separation systems.

BACKGROUND OF THE INVENTION

Fuel cells are environmentally clean, quiet, and highly efficient devices for generating electricity and heat from hydrogen, natural gas, methanol, propane, and other hydrocarbon fuels. Fuel cells convert the energy of a fuel directly into energy—electricity and heat—by an electrochemical process, without combustion or moving parts. Advantages include high efficiency and very low release of polluting gases (e.g., $NO_X$) into the atmosphere. Of the various types of fuel cells, the solid oxide fuel cell (SOFC) offers advantages of high efficiency, low materials cost, minimal maintenance, and direct utilization of various hydrocarbon fuels without extensive reforming. SOFC systems operating with natural gas as a fuel can achieve power generation efficiencies in the range of 40 to 45 percent, and even higher efficiencies are possible with hybrid systems. Power is generated in a solid oxide fuel cell by the transport of oxygen ions (from air) through a ceramic electrolyte membrane where hydrogen and carbon from natural gas are consumed to form water and carbon dioxide. The ceramic electrolyte membrane is sandwiched between electrodes where the power-generating electrochemical reactions occur. Oxygen molecules from air are converted to oxygen ions at the air electrode (cathode), and these oxygen ions react with hydrogen and carbon monoxide to form water and carbon dioxide at the fuel electrode (anode). Compositions commonly used for the ceramic electrolyte membrane material may include lanthanum-strontium-magnesium gallate (LSGM) yttrium-stabilized zirconia (YSZ), gadolinium-doped ceria (GDC), and samarium-doped ceria (SDC), among others.

The fuel electrode (anode) is a composite (cermet) mixture of a ceramic electrolyte material (e.g., YSZ, GDC, SDC, or a combination thereof) and a metal (e.g., nickel). The anode material typically is produced as a mixture of the electrolyte material (e.g., YSZ) and the oxide of the metal (e.g., nickel oxide); prior to operation of the SOFC, the nickel oxide in the composite anode is reduced to nickel metal.

The air electrode (cathode) is a ceramic material. Commonly used cathode compositions may include lanthanum strontium manganite (LSM), lanthanum strontium ferrite (LSF), lanthanum strontium cobalt ferrite (LSCF), samarium strontium cobaltite (SSC), praseodymium strontium manganite (PSM), and praseodymium strontium manganese iron oxide (PSMF), among others. The majority of the cathode materials considered for SOFC applications have a perovskite crystal structure. The perovskite system can be generally described as having the formula $ABO_3$ where the sum of the cation valences in the A and B sites is 6, and the ionic radii of A ranges between 0.8 to 1.40 Å and B ranges between 0.4 to 0.9 Å. Perovskite structures are characterized by 12-fold coordinated A-site cations and six fold coordinated B-site cations. The anion lattice of perovskite materials can be described as a three-dimensional lattice of corner sharing octahedra with the A-site cations occupying the interstitial positions between the octahedra.

"Defective" perovskite structures that can generally be described by the formula

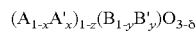

$$(A_{1-x}A'_x)_{1-z}(B_{1-y}B'_y)O_{3-\delta}$$

may be achieved by substituting cations of similar radii (represented by A' and B') but different valence into the A and B sites. To compensate for the charge imbalance created by the cation substitution, oxygen vacancies form in the crystal structure, which is represented in the formula by the $\delta$ term. In some instances, defective perovskite structures may provide enhanced electrochemical performance.

Currently, most developmental SOFC systems operate at relatively high temperatures (i.e., about 800 to 950° C.). Operation of SOFCs at lower temperatures (i.e., about 650 to 750° C.) would minimize adverse chemical reactions between component materials, minimize adverse effects of thermal expansion mismatches between component materials, reduce cost by allowing less expensive metals to be used for interconnects and gas manifolds, and reduce the size and weight of the SOFC power generation system by lessening requirements on heat exchangers and thermal insulation.

However, it has been difficult to achieve high SOFC power densities at low temperatures in solid oxide fuel cells because of increased electrolyte resistance and inefficiency of the electrode materials. It has been demonstrated that reducing the thickness of electrolyte membranes lowers electrolyte resistance. This has been achieved in SOFCs with planar geometries by using one of the porous electrodes (typically the anode) as the bulk structural support (about one millimeter thick), depositing a dense thin film (about ten microns thick) of the electrolyte material on the porous anode substrate, and subsequently depositing the opposite electrode (cathode) as a porous film (about fifty microns thick) on the electrolyte film surface. Very high SOFC power densities have been achieved at temperatures of 750 to 800° C. with planar SOFCs produced with this type of configuration. However, even better SOFC performance and lower temperature operation are expected to be achieved by using improved cathode materials.

Two approaches have been demonstrated for improving low-temperature performance of cathodes in solid oxide fuel cells. The first approach involves addition of electrolyte material to the electrode material, which increases the volume of triple-point (air/electrode/electrolyte) regions where electrochemical reactions occur. This enhancement is most effective in LSM when ceria-based electrolytes (SDC or GDC) are added or when the particle size of the component (electrolyte and electrode) materials is reduced.

The second approach involves replacement of lanthanum strontium manganite (LSM), which conducts electricity solely via electron transport, with mixed-conducting ceramic electrode materials, i.e., materials that conduct electricity via transport of both oxygen ions and electrons. Examples of mixed-conducting electrode materials include (La,Sr)(Mn,Co)O$_3$ (LSMC), (Pr,Sr)MnO$_3$ (PSM), (Pr,Sr)(Mn,Co)O$_3$ (PSMC), (La,Sr)FeO$_3$ (LSF), (La,Sr)(Co,Fe)O$_3$ (LSCF), and (La,Sr)CoO$_3$ (LSC), among others. Of these materials, the LSF compositions, and particularly the cobalt-containing LSF compositions, demonstrate the lower interfacial resistance values, by virtue of intrinsic oxygen vacancy formation at the operating temperature of the cells. As the temperature of the cathode material increases, oxygen vacancies form as $Fe^{3+}$ ions and $Co^{3+}$ ions change valence to 2+, functioning as an in-situ dopant. The Co-containing compositions demonstrate the lowest interfacial resistance, but have high coefficients of thermal expansion (typically 14-20 ppm/° C.) that limit their compatibility with the lower-expansion electrolytes. (YSZ and LSGM typically have thermal expansion coefficients near 10 ppm/° C., while ceria electrolytes typically have a thermal expansion coefficient near 13 ppm/° C.) Low levels of cobalt doping in LSF provide an active electrolyte with limited compatibility with YSZ, but chemical interaction is still a problem at higher operating temperatures.

Accordingly, there is a need in the art for new ceramic electrode compositions that improve the performance of solid oxide fuel cells or other electrochemical devices, reduce the operating temperature of solid oxide fuel cells, and/or allow efficient operation of solid oxide fuel cells with internal reforming of hydrocarbon fuels. Such compositions also must exhibit chemical and mechanical compatibility with electrolytes during cell operation. In addition to identifying appropriate compositions, processes are required to economically produce and deposit such cathode on solid oxide fuel cells, ceramic electrochemical gas separation systems, gas sensors, and ceramic membrane reactors.

It is an object of the invention to provide new ceramic electrode compositions with high electrical conductivity and low interfacial resistance with SOFC electrolytes at operating temperatures below 800° C. It also is an object of the invention to provide new ceramic electrode composition that provide superior performance in other electrochemical devices.

It is another object of the invention to provide methods for economically producing and depositing such compositions for use as electrodes of solid oxide fuel cells, ceramic oxygen generation systems, electrochemical gas separation systems, gas sensors, and ceramic membrane reactors.

These and other objects of the present invention will be apparent from the specification that follows, the appended claims, and the drawings.

SUMMARY OF THE INVENTION

The present invention comprises perovskite electrode materials for electrochemical systems, including 0.5-20 mol % Mg, Zn, Cu, Ni or a mixture thereof in the B site of the material. These compositions exhibit surprising low interfacial resistance compared to conventional electronic cathodes (e.g., LSM) and mixed conducting cathodes (e.g., LSF, LSCF, and LSC).

In one embodiment, the invention defines a ceramic electrode material in powdered form. The material has a perovskite structure and a composition that satisfies the formula $(A_{1-x}A'_x)_{1-z}(B_{1-y}B'_y)O_{3-\delta}$, where x is less than or equal to 0.5, z is less than or equal to 0.20, and y is greater than 0 and less than 0.20. A is selected from a lanthanide element, bismuth, a trivalent cation having an ionic radius between 0.8 and 1.4 Å, and mixtures thereof. A' is selected from an alkaline earth element, lead, a divalent cation having an ionic radius between 0.4 and 0.9 Å, and mixtures thereof. B is selected from Al, Ga, Sn, a transition element other than Cu, Ni, or Zn, and mixtures thereof. B' is selected from Cu; Ni; a mixture of Cu and at least one of Mg, Ni, and Zn; a mixture of Ni and at least one of Cu, Mg, and Zn; a mixture of Mg and at least one of Cu and Ni; a mixture of Zn and at least one of Cu and Ni; and a mixture of Mg, Zn, and at least one of Cu and Ni.

In another embodiment, the invention defines an electrode coating for an electrochemical cell. The coating comprises the above-described ceramic electrode material and a liquid carrier vehicle. The coating is applied in a thin layer to the electrolyte layer of an electrochemical cell. The electrochemical cell may be a solid oxide fuel cell, with the coating being applied to the electrolyte layer of the fuel cell to form the cathode, or a ceramic oxygen generation system, with the coating being applied to the electrolyte layer of the system to form an electrode.

In yet another embodiment, the invention defines an electrode support for an electrochemical cell. The electrode support comprises the above-described ceramic electrode material. The electrochemical cell may be a solid oxide fuel cell with the electrode support comprising the cathode or a ceramic oxygen generation system with the electrode support comprising an electrode of the system.

In still another embodiment, the invention defines a cathode of a solid oxide fuel cell, with the cathode comprising the above-described ceramic electrode material. The invention also may define an electrode of a ceramic oxygen generation system, with the electrode comprising the above-described ceramic electrode material.

Another embodiment of the invention defines a method of making a ceramic electrode material. The method comprises the steps of providing a electrolyte powder, providing a ceramic electrode powder, mixing the electrolyte powder with the electrode powder by attrition or ball milling, and calcining the milled powder mixture. The ceramic electrode powder has a perovskite structure and a composition that satisfies the formula $(A_{1-x}A'_x)_{1-z}(B_{1-y}B'_y)O_{3-\delta}$, where x is less than or equal to 0.5, z is less than or equal to 0.20, and y is greater than 0 and less than 0.20. A is selected from a lanthanide element, bismuth, a trivalent cation having an ionic radius between 0.8 and 1.4 Å, and mixtures thereof. A' is selected from an alkaline earth element, lead, a divalent cation having an ionic radius between 0.4 and 0.9 Å, and mixtures thereof. B is selected from Al, Ga, Sn, a transition element other than Cu, Ni, or Zn, and mixtures thereof. B' is selected from Cu; Ni; a mixture of Cu and at least one of Mg, Ni, and Zn; a mixture of Ni and at least one of Cu, Mg, and Zn; a mixture of Mg and at least one of Cu and Ni; a mixture of Zn and at least one of Cu and Ni; and a mixture of Mg, Zn, and at least one of Cu and Ni. The electrolyte powder of the above described method preferably has a surface area $\geq 20$ m$^2$/gram, more preferably $\geq 50$ m$^2$/gram, and even more preferably $\geq 100$ m$^2$/gram.

The above described method may further comprises the step of calcining the electrolyte powder. The mixing step may include the steps of milling the electrolyte power and the electrode powder in the presence of a surfactant, drying the milled powder mixture, and sieving the milled powder mixture.

The electrolyte powder of the above described method may be yttrium-stabilized zirconia, a doped ceria electrolyte material, barium zirconate, scandium-doped zirconia, a lanthanum gallate based ceramic electrolyte material, a bismuth oxide based electrolyte material, or a mixture thereof. Preferably, the electrolyte power comprises about 1 to 50 volume percent of the electrode powder.

From the foregoing disclosure and the following more detailed description of various embodiments it will be apparent to those skilled in the art that the present invention provides a significant advance in the technology and art of ceramic cathode materials for solid oxide fuel cells and other electrochemical device applications. Particularly significant in this regard is the potential the invention affords for improving performance of solid oxide fuel cells, reducing the operating temperature of solid oxide fuel cells, and/or allowing efficient operation of solid oxide fuel cells with internal reforming of hydrocarbon fuels. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

Figure 1:
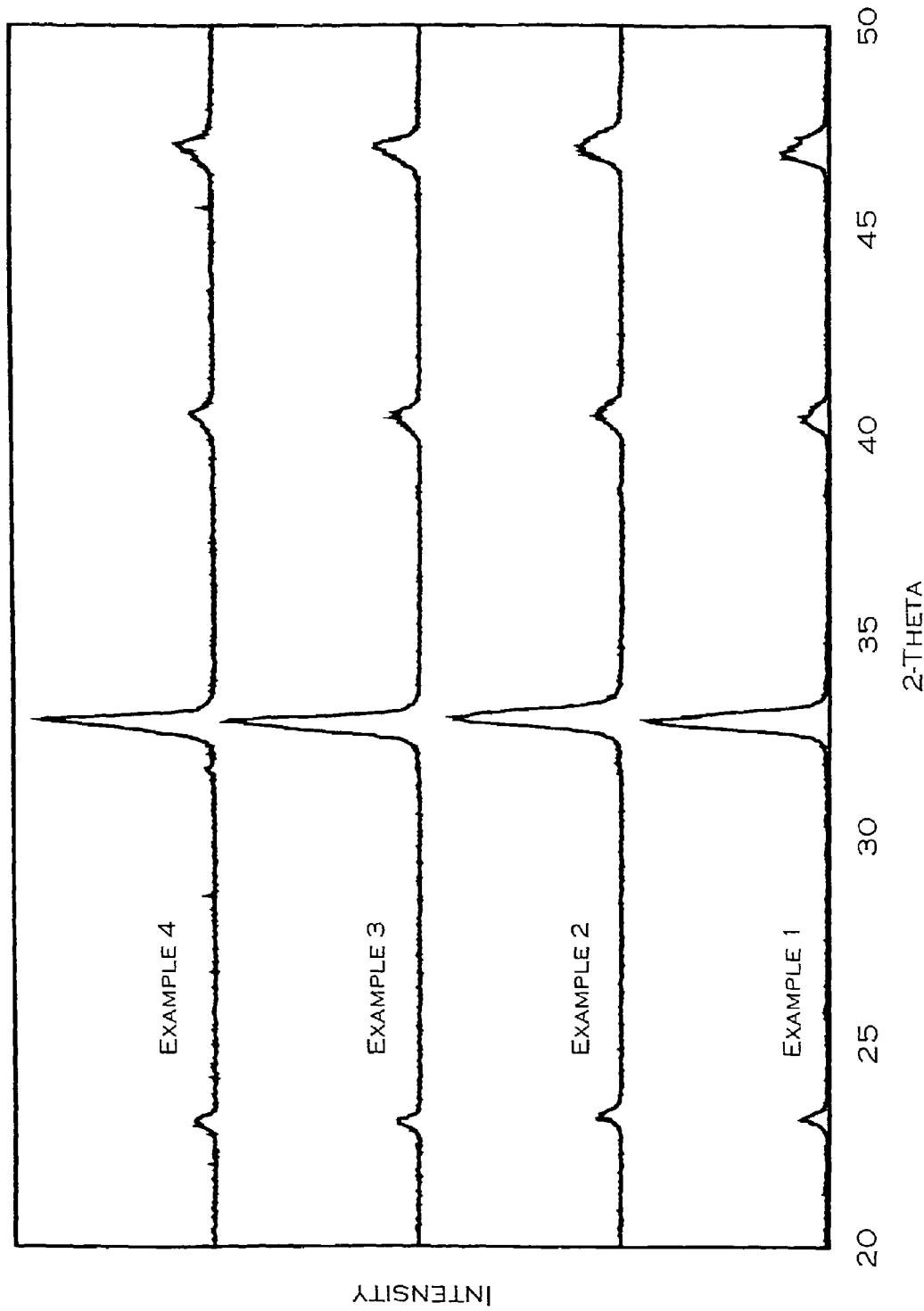
FIG. 1 is an x-ray diffraction pattern of the calcined perovskite electrode powders of Examples 1, 2, 3, and 4.

The present invention comprises perovskite electrode materials for electrochemical systems. including 0.5-20 mol % Mg, Zn, Cu, Ni or a mixture thereof in the B site of the material. These compositions exhibit surprising low interfacial resistance compared to conventional electronic cathodes (e.g., LSM) and mixed conducting cathodes (e.g., LSF, LSCF, and LSC).

Compared with conventional perovskite conductors, the disclosed materials are expected to have a higher oxygen vacancy concentration in the crystal structure because the B-site dopants (Mg, Cu, Ni, and Zn) prefer the 2+ valence. The presence of oxygen vacancies in the structure allows greater oxygen ion conductivity and uptake/release kinetics are expected to be higher in these materials at temperatures below 700° C., giving rise to lower interfacial resistance values. The disclosed materials offer these advantages over a broad range of temperatures, including temperatures below 700° C., compared with conventional mixed conductors that typically develop significant oxygen vacancy concentrations on heating in air (at approximately 700° C.).

The compositions of the present invention also demonstrate novel behavior with respect to doping levels and performance. Other researchers have reported Ni-doping of LSF-based cathode materials as well as $LaNiO_3$-based cathodes. These studies have focused on doped compositions with Ni-concentrations of 20 mol % and higher for the cathode evaluations, primarily due to the high electrical conductivity of these compositions. However, as explained in the examples below, the most effective compositions in these systems do not correspond to those with the highest electrical conductivity, nor is interfacial resistance monotonically controlled by dopant concentration.

A variety of A-site cations and dopant species can be selected for use in the compositions of the present invention to tailor compositions for particular electrolytes and cell configurations. As will be disclosed in the examples, controlling the A-site composition has a direct impact on electrode performance and thermal expansion behavior. Suitable A-site elements include a lanthanide element, bismuth, a trivalent cation having an ionic radius between 0.8 and 1.4 Å, and mixtures thereof, while suitable A-site dopants include an alkaline earth element, lead, a divalent cation having an ionic radius between 0.4 and 0.9 Å, and mixtures thereof.

The present invention encompasses electrode powders that have a perovskite structure and a composition that satisfies the formula $(A_{1-x}A'_x)_{1-z}(B_{1-y}B'_y)O_{3-\delta}$, where A is a lanthanide element bismuth, a trivalent cation having an ionic radius between 0.8 and 1.4 Å, or a mixture thereof; A' is an alkaline earth element, lead, a divalent cation having an ionic radius between 0.4 and 0.9 Å, or a mixture thereof; B is selected from Al, Ga, Sn, a transition element other than Cu, Ni, or Zn, and mixtures thereof; B' is Mg, Cu, Ni, Zn, or a combination thereof; x is less than or equal to 0.5; z is less than or equal to 0.20; and y is greater than zero and less than 0.20. Examples include, but are not limited to, lanthanum strontium iron nickel oxide (LSFN), lanthanum strontium iron zinc oxide (LSFZ), lanthanum strontium iron copper oxide (LSFCu), lanthanum strontium manganese nickel oxide (LSMN), lanthanum strontium manganese zinc oxide (LSMZ), lanthanum strontium manganese copper oxide (LSMCu), lanthanum strontium cobalt nickel oxide (LSCN), lanthanum strontium cobalt zinc oxide (LSCZ), lanthanum strontium cobalt copper oxide (LSCCu), and analogous perovskite systems with alternate lanthanide elements or mixtures of such elements substituted for La or alkaline earth elements or mixtures of such elements substituted for strontium. The ceramic electrode material may be a physical mixture of a majority and at least one minority ceramic electrode material component, with the majority component having a composition described above.

The invention encompasses a electrode coating for electrochemical cells, including without limitation solid oxide fuel cells and ceramic oxygen generation systems, in which the coating comprises a ceramic electrode material with a composition described above and a liquid carrier vehicle, which is applied in a thin layer to the electrolyte layer of the electrochemical cell. The invention also encompasses an electrode support for an electrochemical cell, including without limitation solid oxide fuel cells and ceramic oxygen generation systems, in which the support comprises a ceramic electrode material with a composition described above. The invention further encompasses a cathode of a fuel cell and an electrode of a ceramic oxygen generation system, each comprising a ceramic electrode material with a composition described above.

In addition, the invention encompasses a method of making a ceramic electrode material, including the steps of providing an electrolyte powder; providing an electrode powder that satisfies the formula $(A_{1-x}A'_x)_{1-z}(B_{1-y}B'_y)O_{3-\delta}$, where A is a lanthanide element, bismuth, a trivalent cation having an ionic radius between 0.8 and 1.4 Å, or a mixture thereof; A' is an alkaline earth element, lead, a divalent cation having an ionic radius between 0.4 and 0.9 Å, or a mixture thereof; B is selected from Al, Ga, Sn, a transition element other than Cu, Ni, or Zn, and mixtures thereof; B' is Mg, Cu, Ni, Zn, or a combination thereof; x is less than or equal to 0.5; z is less than or equal to 0.20; and y is greater than zero and less than 0.20; mixing the electrolyte powder with the electrode powder by a mixing method selected from attrition milling and ball milling; and calcining the milled powder mixture. The method also may include the step of calcining the electrolyte powder. The mixing step also may include the steps of milling the electrolyte power and the electrode powder in the presence of a surfactant, drying the milled powder mixture, and sieving the milled powder mixture.

In various embodiments of the invention, the electrolyte powder may have a surface area $\geq 20$ m$^2$/gram (e.g., a nanoscale powder), $\geq 50$ m$^2$/gram, or $\geq 100$ m$^2$/gram. The electrolyte powder may be yttrium-stabilized zirconia, a doped ceria electrolyte material, barium zirconate, scandium-doped zirconia, a lanthanum gallate based ceramic electrolyte material, or a bismuth oxide based electrolyte material. The electrolyte powder mixture preferably comprises 1 to 50 volume percent of the electrode material.

The invention also encompasses a cathode coating for a solid oxide fuel cell in which the coating comprises a ceramic electrode material prepared by a process described above and a cathode substrate for a solid oxide fuel cell in which the substrate comprises a ceramic electrode material of a composition described above.

The examples describe preparation of novel perovskite electrode compositions in which one or more of the elements Mg, Ni, Cu, and Zn are present as minority components and a comparison of the properties of an SOFC having a cathode of the present invention with those of an SOFC having a conventional LSF cathode.

EXAMPLE 1

465.85 of La$_2$(CO$_3$)$_3$, 135.08 g of SrCO$_3$, 175.53 g of Fe$_2$O$_3$, and 14.73 g of Ni$_2$(CO$_3$)$_3$ were weighed into a one-liter bottle and mixed for one hour by dry milling. The resulting mixture was attrition milled for three hours in IPA, then dried in ambient conditions before being sieved through a 35-mesh screen. The resulting powder was then calcined at 800° C. for eight hours to decompose the carbonate precursors. The calcined powder was attrition milled for 3 hours. Three 20-gram samples of the attrition milled powder were calcined for four hours at 900° C., 1000° C., and 1100° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 1. The remaining attrition milled mixture was calcined at 1000° C. for eight hours to assure reaction was complete. The resulting powder had a measured surface area of 3.101 m$^2$/g, and was sieved through a 100-mesh screen prior to storage.

Figure 9:
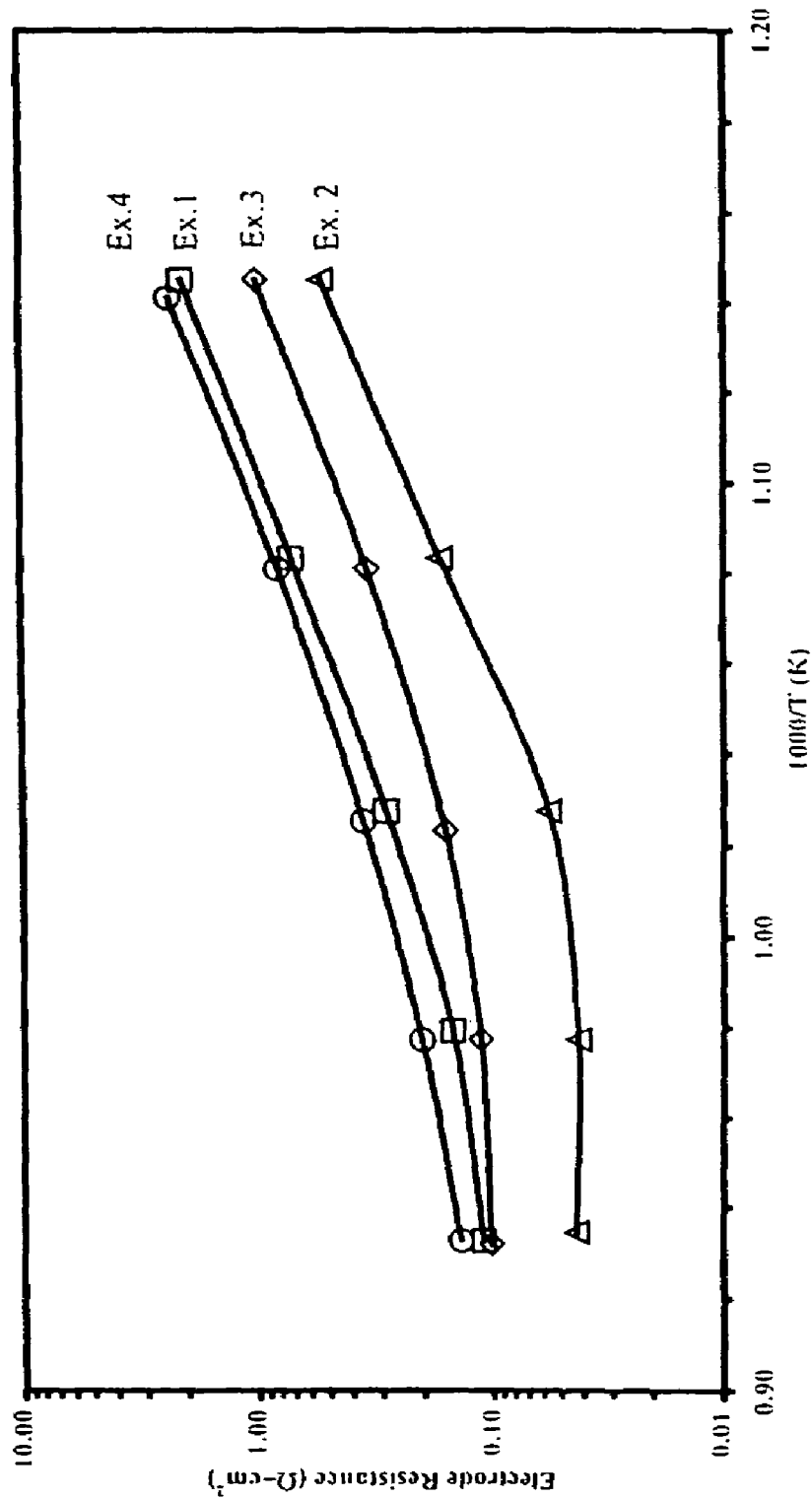
FIG. 9 is a graph of interfacial resistance of the perovskite electrodes of Examples 1, 2, 3, and 4 versus the reciprocal temperatures, measured with symmetrical electrodes on GDC electrolyte discs.

A screen printing ink was prepared by mixing 7.70 g of the calcined powder and 5.13 g of a commercial terpineol ink vehicle using a three roll mill. The resulting ink was screen printed onto both sides of a GDC disc in a 1.27 cm diameter disc pattern. The symmetrically electroded disc was fired at 1200° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 9.

EXAMPLE 2

465.55 of La$_2$(CO$_3$)$_3$, 135.00 g of SrCO$_3$, 166.19 g of Fe$_2$O$_3$, and 29.43 g of Ni$_2$(CO$_3$)$_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 900° C., 1000° C., and 1100° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 1. The remaining attrition milled mixture was calcined at 1000° C. for eight hours to assure reaction was complete. The resulting powder had a measured surface area of 3.47 m²/g, and was sieved through a 100-mesh screen prior to storage.

A screen printing ink was prepared by mixing 7.62 g of the calcined powder and 5.08 g of a commercial terpineol ink vehicle using a three roll mill. The resulting ink was screen printed onto both sides of a GDC disc in a 1.27 cm diameter disc pattern. The symmetrically electroded disc was fired at 1200° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 9.

EXAMPLE 3

463.62 of $La_2(CO_3)_3$, 133.29 g of $SrCO_3$, 156.43 g of $Fe_2O_3$, and 44.00 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 900° C., 1000° C., and 1100° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 1. The remaining attrition milled mixture was calcined at 1000° C. for eight hours to assure reaction was complete. The resulting powder had a measured surface area of 3.47 m²/g, and was sieved through a 100-mesh screen prior to storage.

A screen printing ink was prepared by mixing 15.00 g of the calcined powder and 7.50 g of a commercial terpineol ink vehicle using a three roll mill. The resulting ink was screen printed onto both sides of a GDC disc in a 1.27 cm diameter disc pattern. The symmetrically electroded disc was fired at 1150° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 9.

EXAMPLE 4

463.32 of $La_2(CO_3)_3$, 133.20 g of $SrCO_3$, 147.14 g of $Fe_2O_3$, and 58.63 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 900° C., 1000° C., and 1100° C., respectively. The resulting calcined powders were ground and sieved through a 200-mesh screen prior to x-ray diffraction analysis at 2°/min from 200 to 50° 2 theta, using a CuKα x-ray source. Evaluation of the x-ray diffraction data showed that 1100° C. calcination for four hours was sufficient to allow the formation of the perovskite structure shown in FIG. 1. The remaining attrition milled mixture was calcined at 1100° C. for eight hours to assure reaction was complete. The resulting powder had a measured surface area of 2.125 m²/g, and was sieved through a 100-mesh screen prior to storage.

A screen printing ink was prepared by mixing 15.00 g of the calcined powder and 10.01 g of a commercial terpineol ink vehicle using a three roll mill. The resulting ink was screen printed onto both sides of a GDC disc in a 1.27 cm diameter disc pattern. The symmetrically electroded disc was fired at 1100° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 9.

EXAMPLE 5

Figure 2:
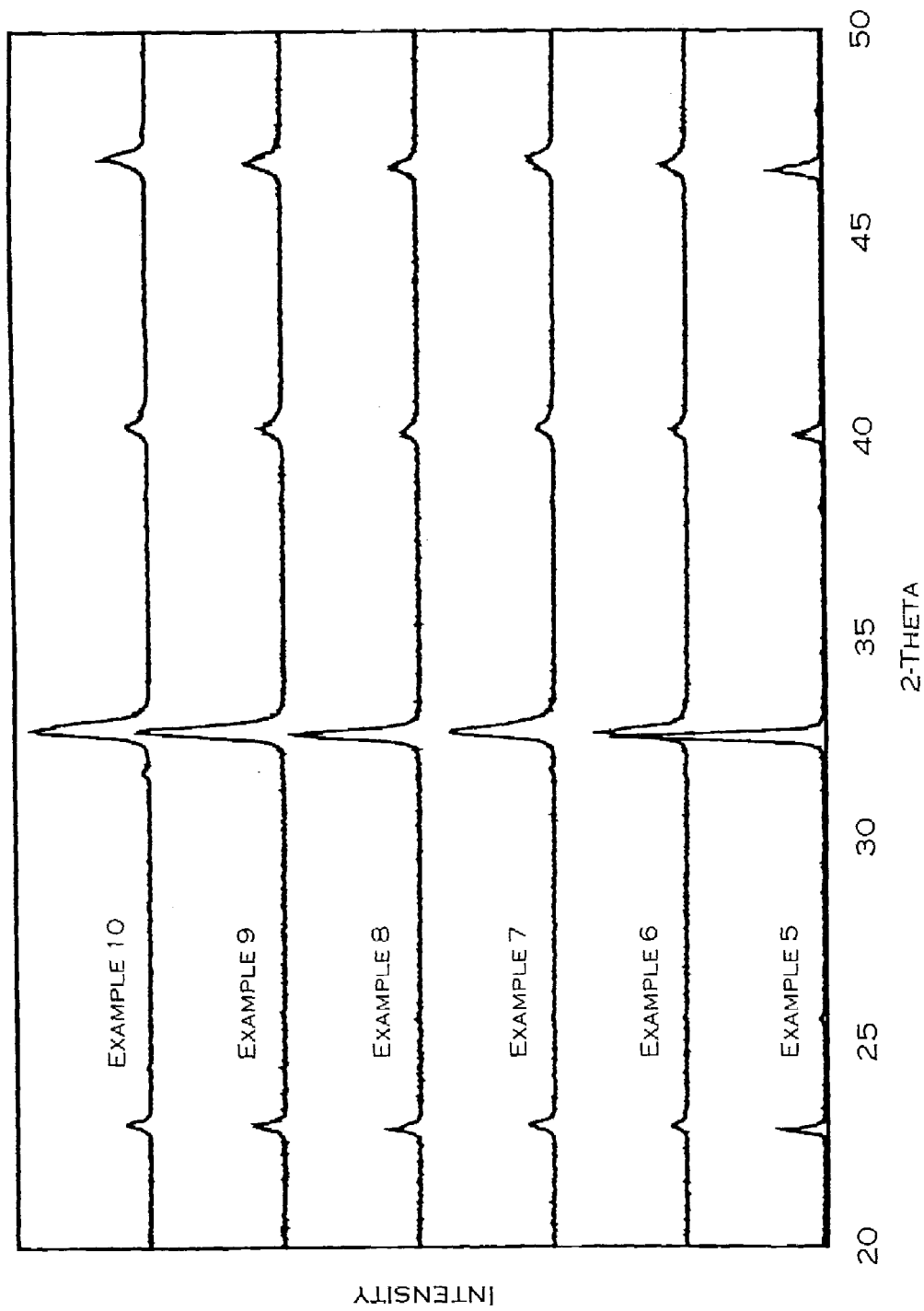
FIG. 2 is an x-ray diffraction pattern of the calcined perovskite electrode powders of Examples 5, 6, 7, 8, 9, and 10.

520.78 of $La_2(CO_3)_3$, 24.95 g of $SrCO_3$, 124.04 g of $Fe_2O_3$, and 21.97 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder then attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1200° C. calcination for four hours was sufficient to allow the formation of the perovskite structure shown in FIG. 2. The remaining attrition milled mixture was calcined at 1200° C. for eight hours to assure reaction was complete. The resulting powder had a measured surface area of 1.565 m$^2$/g. The powder was then attrition milled a final time for three hours to achieve a surface area of 4.134 m$^2$/g and after drying was sieved through a 100-mesh screen prior to storage.

Figure 10:
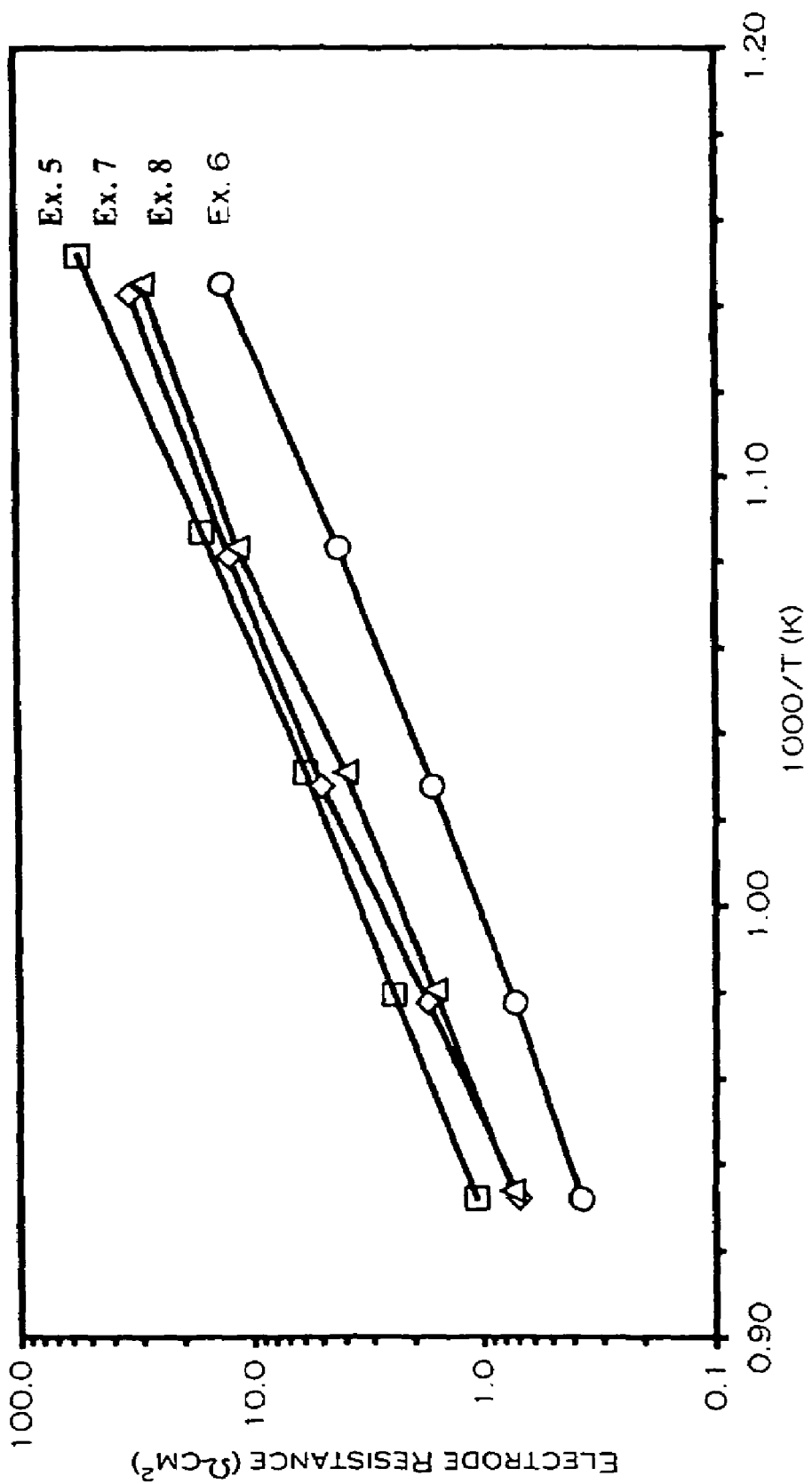
FIG. 10 is a graph of the interfacial resistance of the perovskite electrodes of Examples 5, 6, 7, and 8 versus the reciprocal temperatures, measured with symmetrical electrodes on GDC electrolyte discs.

A screen printing ink was prepared by mixing 9.32 g of the calcined powder and 4.67 g of a commercial terpineol ink vehicle using a three roll mill. The resulting ink was screen printed onto both sides of a GDC disc in a 1.27 cm diameter disc pattern. The symmetrically electroded disc was fired at 1100° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 10.

EXAMPLE 6

522.15 of $La_2(CO_3)_3$, 24.85 g of $SrCO_3$, 110.13 g of $Fe_2O_3$, and 43.89 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 2. The remaining attrition milled mixture was calcined at 1000° C. for eight hours to assure reaction was complete. The resulting powder had a measured surface area of 4.47 m$^2$/g, and was sieved through a 100-mesh screen prior to storage. Interfacial resistance values for a disc sample prepared by applying the resulting powder as a printing ink are plotted in FIG. 10.

EXAMPLE 7

519.53 of $La_2(CO_3)_3$, 24.89 g of $SrCO_3$, 96.24 g of $Fe_2O_3$, and 65.74 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for four hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1200° C. calcination for four hours was sufficient to allow the formation of the perovskite structure shown in FIG. 2. The remaining attrition milled mixture was calcined at 1200° C. for eight hours to assure reaction was complete. The resulting powder had a measured surface area of 0.452 m$^2$/g. The calcined powder was attrition milled a final time to achieve a surface area of 5.36 m$^2$/g and after drying was sieved through a 100-mesh screen prior to storage.

A screen printing ink was prepared by mixing 8.13 g of the calcined powder and 5.36 g of a commercial terpineol ink vehicle using a three roll mill. The resulting ink was screen printed onto both sides of a GDC disc in a 1.27 cm diameter disc pattern. The symmetrically electroded disc was fired at 1100° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 10.

EXAMPLE 8

473.09 of $La_2(CO_3)_3$, 51.00 g of $SrCO_3$, 126.77 g of $Fe_2O_3$, and 22.45 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder then attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 2. The remaining attrition milled mixture was calcined at 1100° C. for eight hours to assure reaction was complete. The resulting powder had a measured surface area of 2.628 m$^2$/g. The calcined powder was attrition milled a final time to achieve a surface area of 5.719 m$^2$/g and after drying was sieved through a 100-mesh screen prior to storage.

A screen printing ink was prepared by mixing 7.36 g of the calcined powder and 3.69 g of a terpineol ink vehicle using a three roll mill. The resulting ink was screen printed onto both sides of a GDC disc in a 1.27 cm diameter disc pattern. The symmetrically electroded disc was fired at 1100° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 10.

EXAMPLE 9

474.32 of $La_2(CO_3)_3$, 50.81 g of $SrCO_3$, 112.54 g of $Fe_2O_3$, and 44.85 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 2. The remaining attrition milled mixture was calcined at 1100° C. for eight hours to assure reaction was complete. The resulting powder had a measured surface area of 4.794 $m^2/g$, and was sieved through a 100-mesh screen prior to storage.

A screen printing ink was prepared by mixing 10.01 g of the calcined powder and 6.67 g of a commercial terpineol ink vehicle using a three roll mill. The resulting ink was screen printed onto both sides of a GDC disc in a 1.27 cm diameter disc pattern. The symmetrically electroded disc was fired at 1000° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values.

EXAMPLE 10

471.93 of $La_2(CO_3)_3$, 50.88 g of $SrCO_3$, 98.36 g of $Fe_2O_3$, and 67.19 g of $Ni_2(CO_3)_3$ weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 200 to 50° 2 theta, using a CuKα x-ray source. Evaluation of the x-ray diffraction data showed that 1200° C. calcination for four hours was sufficient to allow the formation of the perovskite structure shown in FIG. 2.

EXAMPLE 11

Figure 3:
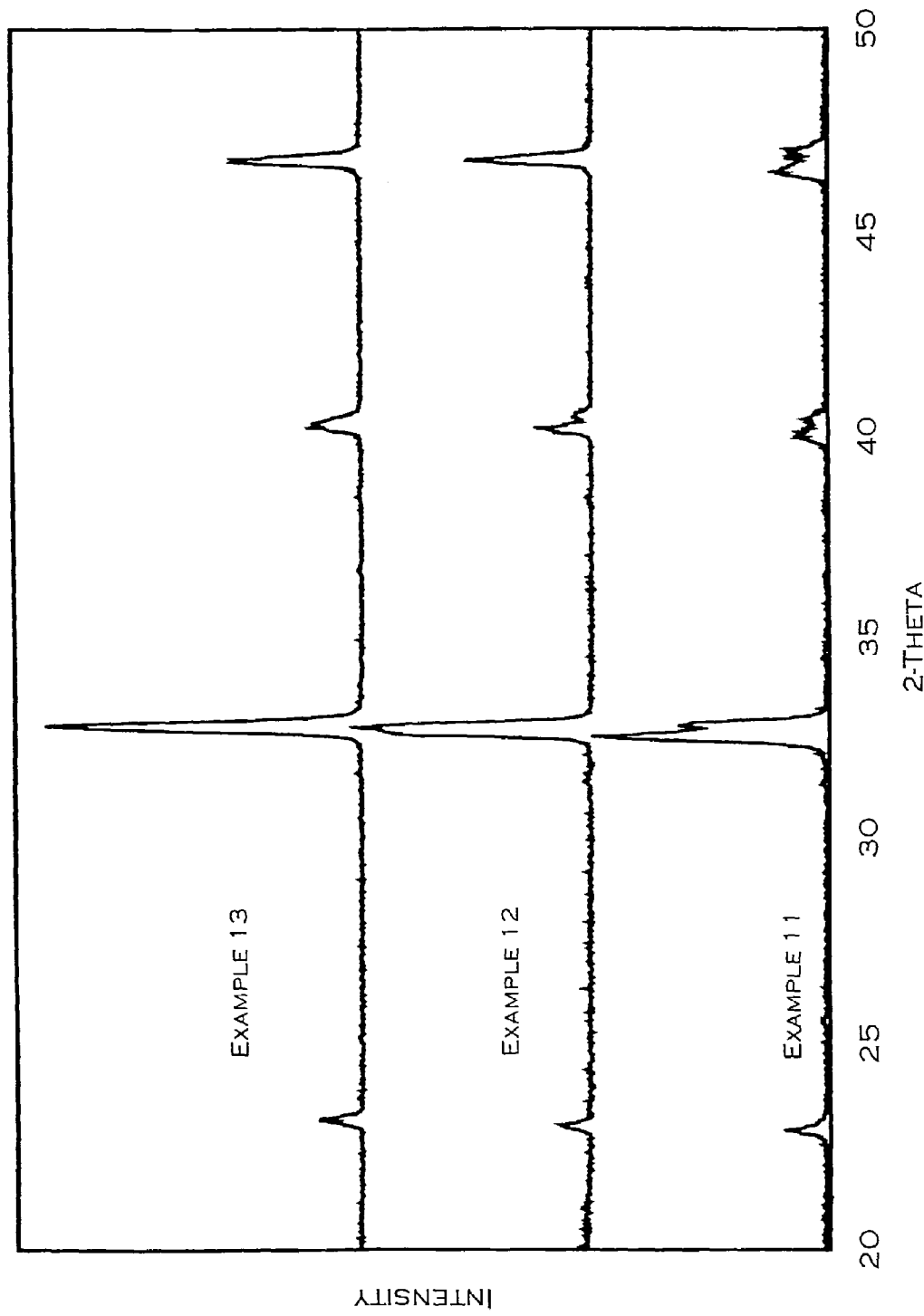
FIG. 3 is an x-ray diffraction pattern of the calcined perovskite electrode powders of Examples 11, 12, and 13.

463.52 of $La_2(CO_3)_3$, 133.26 g of $SrCO_3$, 147.80 g of $Fe_2O_3$, and 32.44 g of $Zn(NO_3)_2$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 3. The remaining attrition milled mixture was calcined at 1100° C. for eight hours to assure reaction was complete. The calcined powder was attrition milled a final time to achieve a surface area of 4.431 $m^2/g$, and after drying was sieved through a 100-mesh screen prior to storage.

Figure 11:
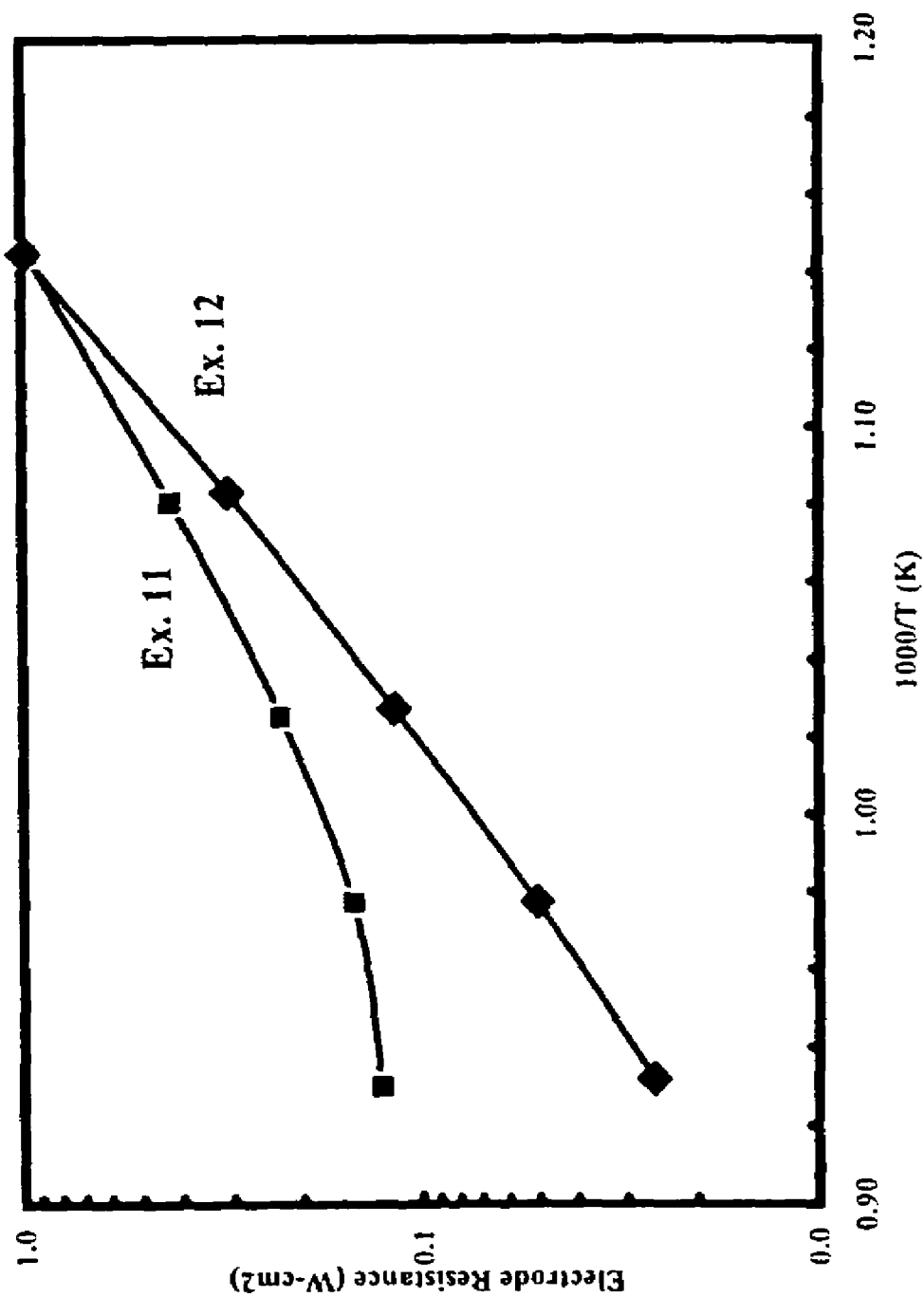
FIG. 11 is a graph of the interfacial resistance of the perovskite electrodes of Examples 11 and 12 versus the reciprocal temperatures, measured with symmetrical electrodes on GDC electrolyte discs.

A screen printing ink was prepared by mixing 10.02 g of the calcined powder and 6.67 g of a commercial terpineol ink vehicle using a three roll mill. The resulting ink was screen printed onto both sides of a GDC disc in a 1.27 cm diameter disc pattern. The symmetrically electroded disc was fired at 1000° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 11.

EXAMPLE 12

464.29 g of $La_2(CO_3)_3$, 132.65 g of $SrCO_3$, 166.44 g of $Fe_2O_3$, and 64.73 g of $Zn(NO_{32}$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1300° C. calcination for eight hours was sufficient to allow the formation of the perovskite structure shown in FIG. 3. The remaining attrition milled mixture was calcined at 1300° C. for eight hours to assure reaction was complete.

A screen printing ink was prepared by mixing 3.60 g of the calcined powder and 2.07 g of a commercial terpineol ink vehicle using a three roll mill. The resulting ink was screen printed onto both sides of a GDC disc in a 1.27 cm diameter disc pattern. The symmetrically electroded disc was fired at 1200° C. for 1 hour to achieve adhesion. Adhesion was tested by applying transparent tape and removing the tape; samples that the cathode did not pull off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 11.

EXAMPLE 13

529.52 g of $La_2(CO_3)_3$, 97.24 g of $SrCO_3$, 102.71 g of $Fe_2O_3$, and 63.27 g of $Zn(NO_3)_2$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1300° C. calcination for eight hours was sufficient to allow the formation of the perovskite structure shown in FIG. 3. The remaining attrition milled mixture was calcined at 1300° C. for eight hours to assure reaction was complete.

EXAMPLE 14

464.30 of $La_2(CO_3)_3$, 132.63 g of $SrCO_3$, 166.45 g of $Fe_2O_3$, and 21.87 g of $MgCO_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1400° C. calcination for four hours was sufficient to allow the formation of the perovskite structure shown in FIG. 4. The remaining attrition milled mixture was calcined at 1400° C. for eight hours to assure reaction was complete.

EXAMPLE 15

Figure 4:
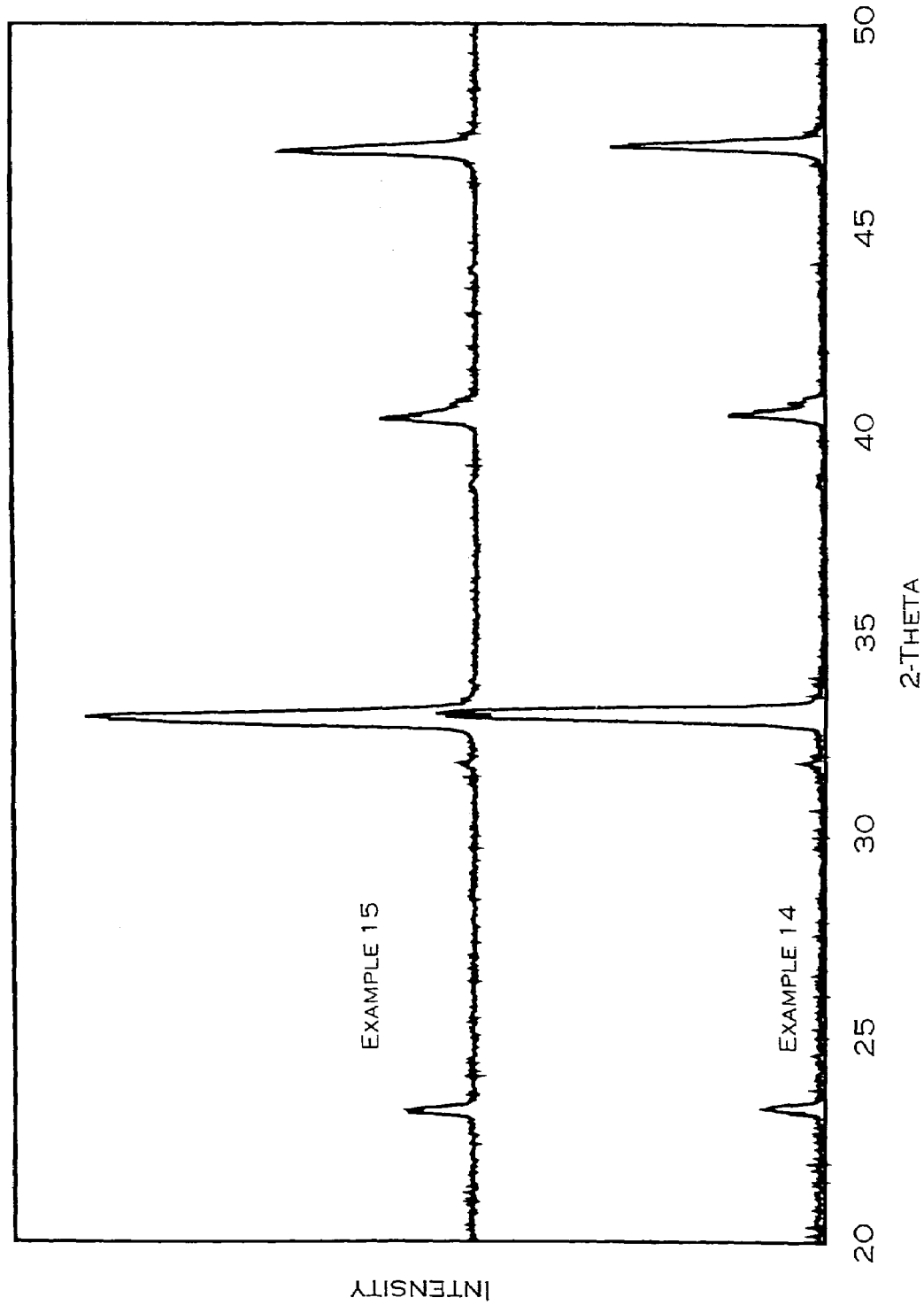
FIG. 4 is an x-ray diffraction pattern of the calcined perovskite electrode powders of Examples 14 and 15.

529.54 g of $La_2(CO_3)_3$, 97.24 g of $SrCO_3$, 162.72 g of $Fe_2O_3$, and 21.38 g of $MgCO_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. FIG. 4 shows an x-ray diffraction pattern of the calcined perovskite electrode powder of Example 15.

EXAMPLE 16

Figure 5:
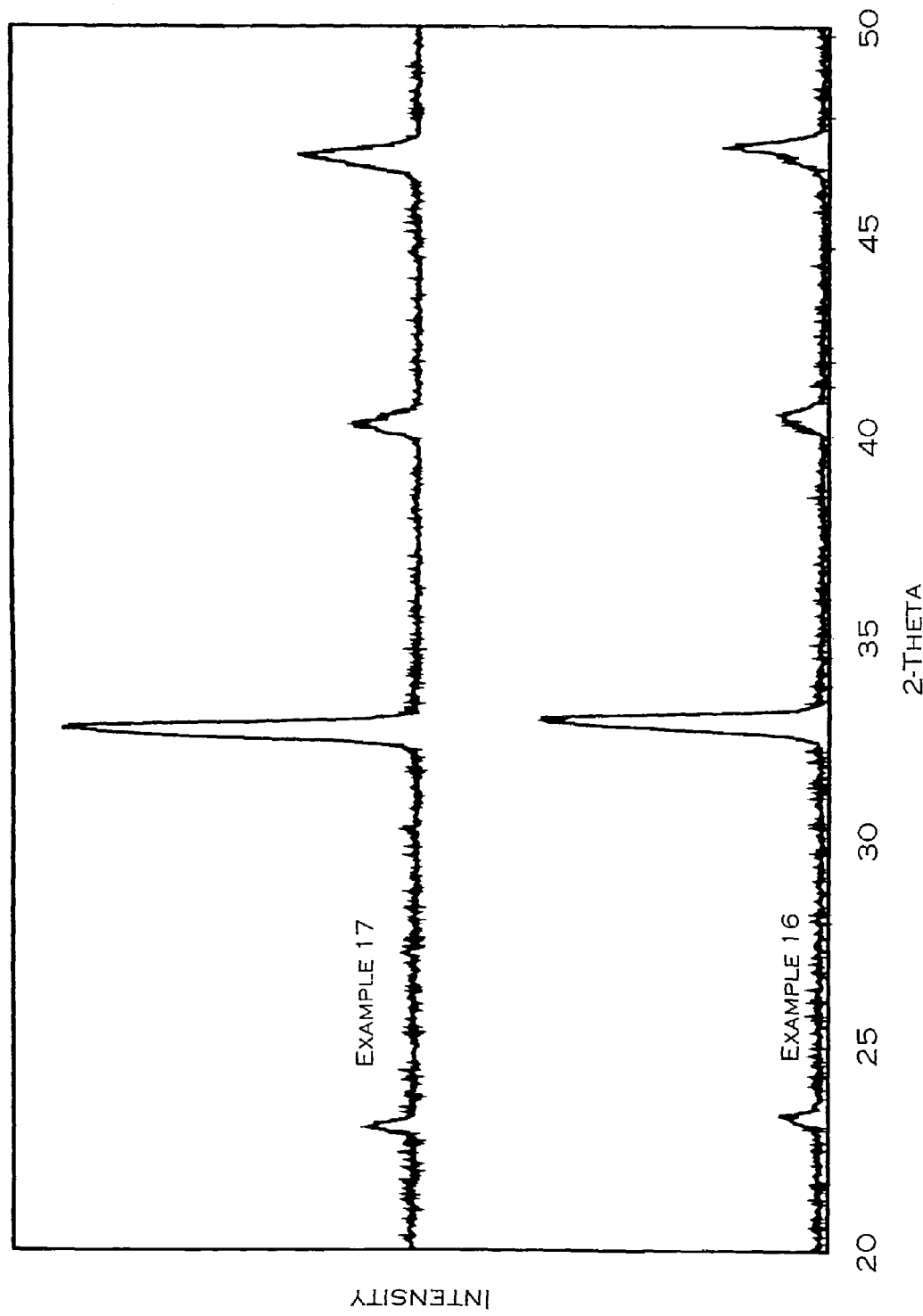
FIG. 5 is an x-ray diffraction pattern of the calcined perovskite electrode powders of Examples 16 and 17.

463.71 g of $La_2(CO_3)_3$, 133.32 g of $SrCO_3$, 174.88 g of $Fe_2O_3$, and 8.07 g of $Cu_2O$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 5. The remaining attrition milled mixture was calcined at 1100° C. for eight hours to assure reaction was complete. The calcined powder was attrition milled a final time to achieve a surface area of 4.039 $m^2/g$ and after drying was sieved through a 100-mesh screen prior to storage.

Figure 12:
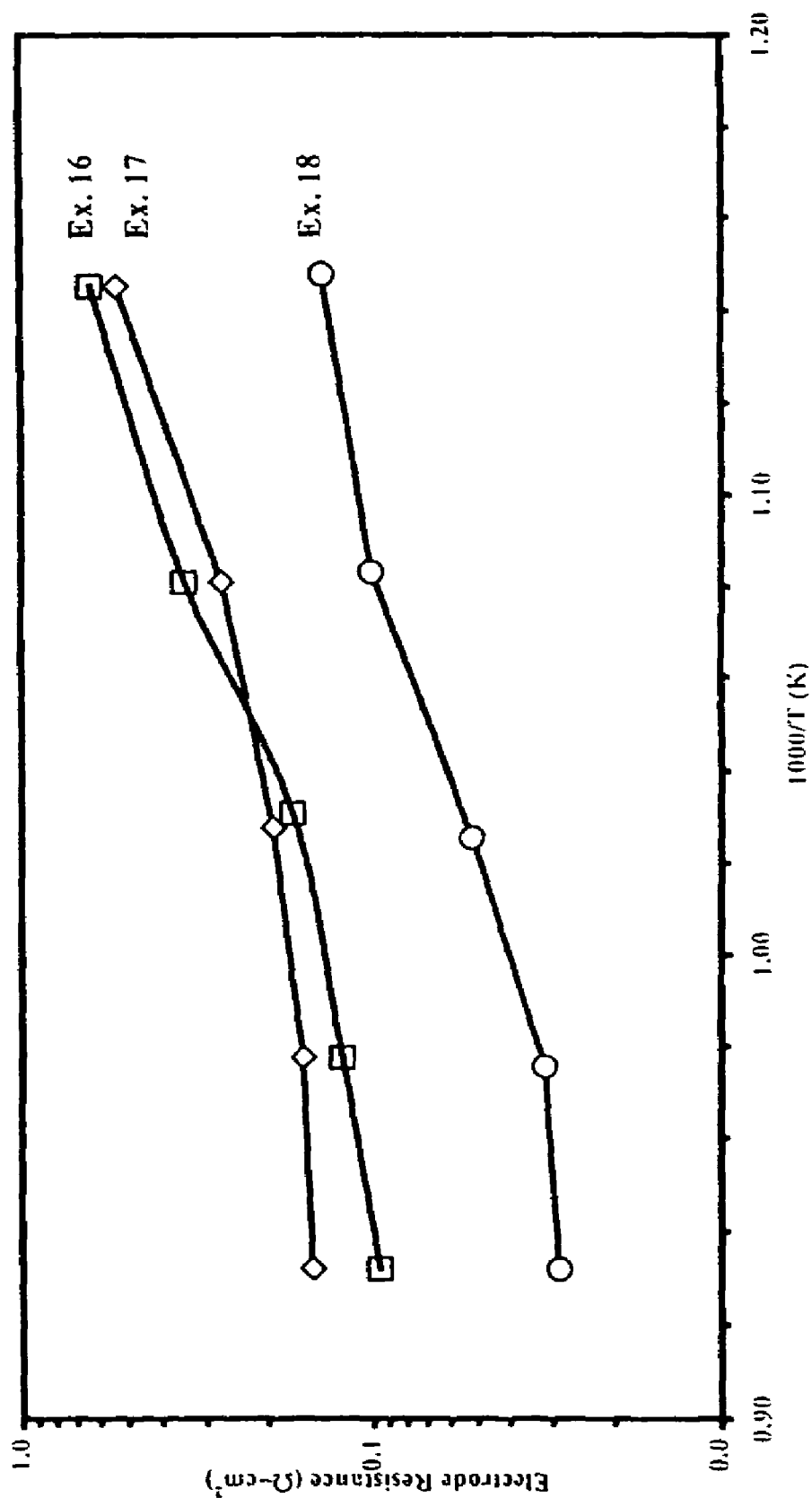
FIG. 12 is a graph of the interfacial resistance of the perovskite electrodes of Examples 16, 17, and 18 versus the reciprocal temperatures, measured with symmetrical electrodes on GDC electrolyte discs.

A screen printing ink was prepared by mixing 10.02 g of the calcined powder and 6.68 g of a commercial ink terpineol vehicle using a three roll mill. The resulting ink was screen printed onto both sides of a GDC disc in a 1.27 cm diameter disc pattern. The symmetrically electroded disc was fired at 1000° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 12.

EXAMPLE 17

367.89 of $La_2(CO_3)_3$, 110.56 g of $SrCO_3$, 88.27 g of $Fe_2O_3$, and 16.11 g of $Cu_2O$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 5. The remaining attrition milled mixture was calcined at 1100° C. for eight hours to assure reaction was complete. The resulting powder had a measured surface area of 5.044 m$^2$/g, and was sieved through a 100-mesh screen prior to storage.

A screen printing ink was prepared by mixing 10.00 g of the calcined powder and 6.67 g of a commercial terpineol ink vehicle using a three roll mill. The resulting ink was screen printed onto both sides of a GDC disc in a 1.27 cm diameter disc pattern. The symmetrically electroded disc was fired at 1000° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 12.

EXAMPLE 18

285.92 of La$_2$(CO$_3$)$_3$, 82.91 g of SrCO$_3$, 90.72 g of Fe$_2$O$_3$, and 19.88 g of Cu$_2$O were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 950° C., 1050° C., and 1100° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1050° C. calcination for four hours was sufficient to allow the formation of a perovskite structure. The remaining attrition milled mixture was calcined at 1050° C. for eight hours to assure reaction was complete. The resulting powder had a measured surface area of 5.025 m$^2$/g, and was sieved through a 100-mesh screen prior to storage.

A screen printing ink was prepared by mixing 10.00 g of the calcined powder and 5.02 g of a commercial terpineol ink vehicle using a three roll mill. The resulting ink was screen printed onto both sides of a GDC disc in a 1.27 cm diameter disc pattern. The symmetrically electroded disc was fired at 1050° C. for 1 hour to achieve adhesion. Adhesion was tested by applying transparent (e.g., Scotch brand) tape and removing the tape; cathode inks that did not peel off the GDC disc with the tape were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 12.

EXAMPLE 19

Figure 6:
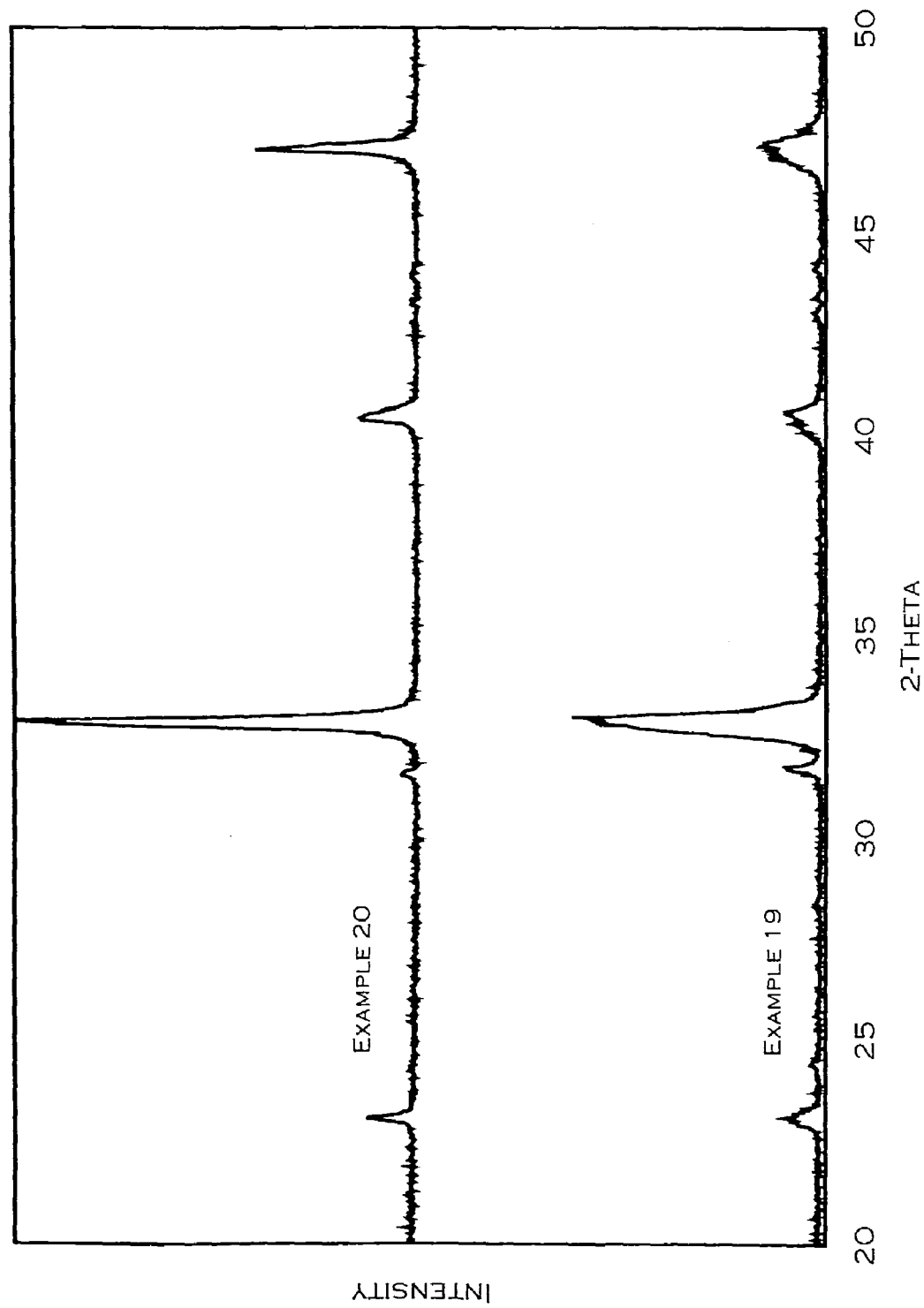
FIG. 6 is an x-ray diffraction pattern of the calcined perovskite electrode powders of Examples 19 and 20.

462.68 of La$_2$(CO$_3$)$_3$, 133.02 g of SrCO$_3$, 128.57 g of Fe$_2$O$_3$, 28.86 g of CoCO$_3$, and 58.55 g of NiCO$_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 900° C., 1000° C., and 1100° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 6. The remaining attrition milled mixture was calcined at 1000° C. for eight hours to assure reaction was complete. The resulting powder had a measured surface area of 2.533 m$^2$/g, and was sieved through a 100-mesh screen prior to storage.

Figure 13:
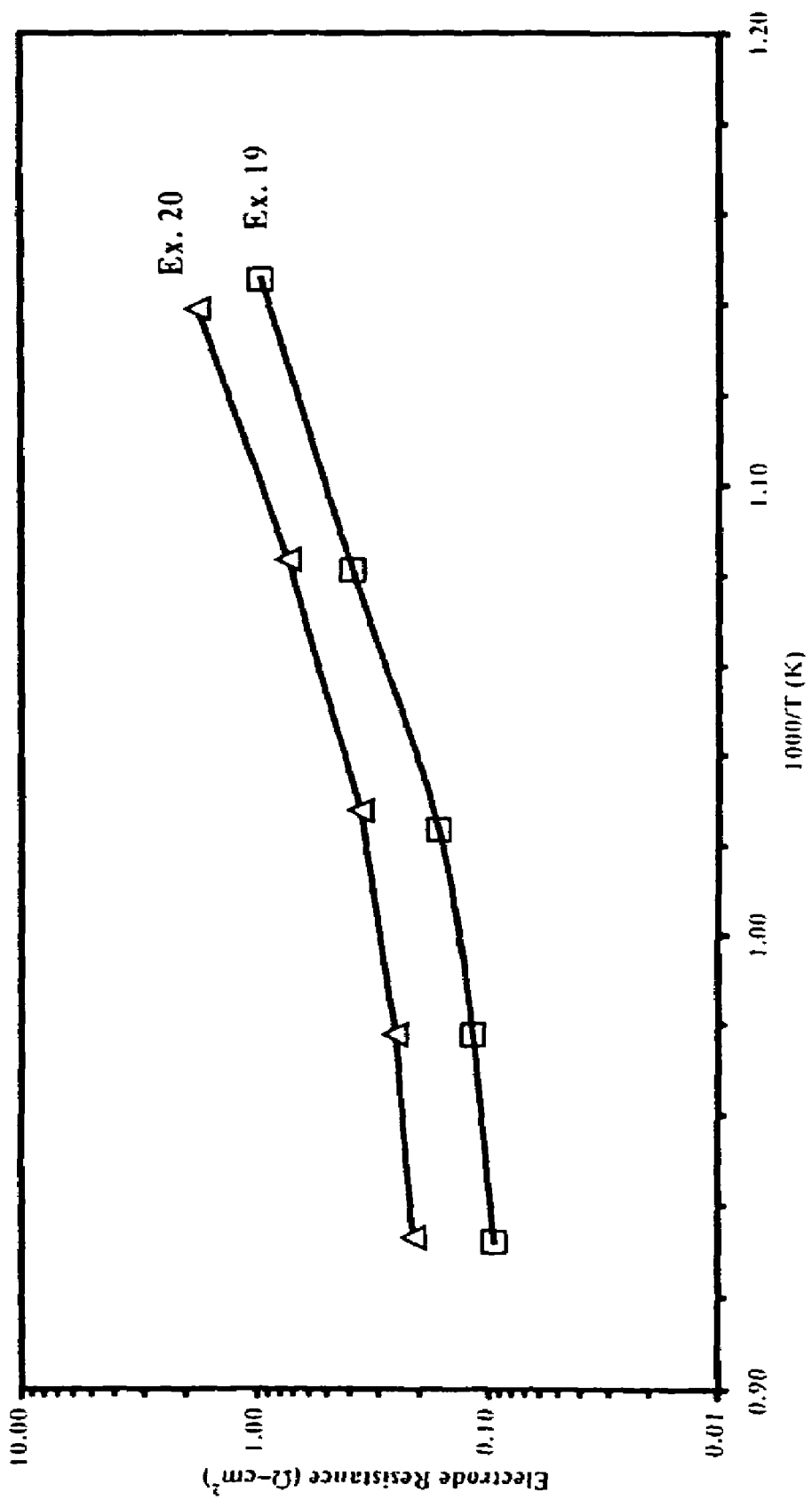
FIG. 13 is a graph of the interfacial resistance of the perovskite electrodes of Examples 19 and 20 versus the reciprocal temperatures, measured with symmetrical electrodes on GDC electrolyte discs.

A screen printing ink was prepared by mixing 15.00 g of the calcined powder and 7.50 g of a commercial terpineol ink vehicle using a three roll mill. The resulting ink was screen printed onto both sides of a GDC disc in a 1.27 cm diameter disc pattern. The symmetrically electroded disc was fired at 1150° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 13.

EXAMPLE 20

367.89 of La$_2$(CO$_3$)$_3$, 110.56 g of SrCO$_3$, 88.27 g of Fe$_2$O$_3$, 46.23 g of CoCO$_3$, and 26.9 g of NiO were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1200° C. calcination for four hours was sufficient to allow the formation of the perovskite structure shown in FIG. 6. The remaining attrition milled mixture was calcined at 1200° C. for eight hours to assure reaction was complete. The resulting powder had a measured surface area of 0.38 $m^2/g$, and was sieved through a 100-mesh screen prior to storage.

A screen printing ink was prepared by mixing 13.44 g of the calcined powder and 6.68 g of a commercial terpineol ink vehicle using a three roll mill. The resulting ink was screen printed onto both sides of a GDC disc in a 1.27 cm diameter disc pattern. The symmetrically electroded disc was fired at 1250° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 13.

EXAMPLE 21

Figure 7:
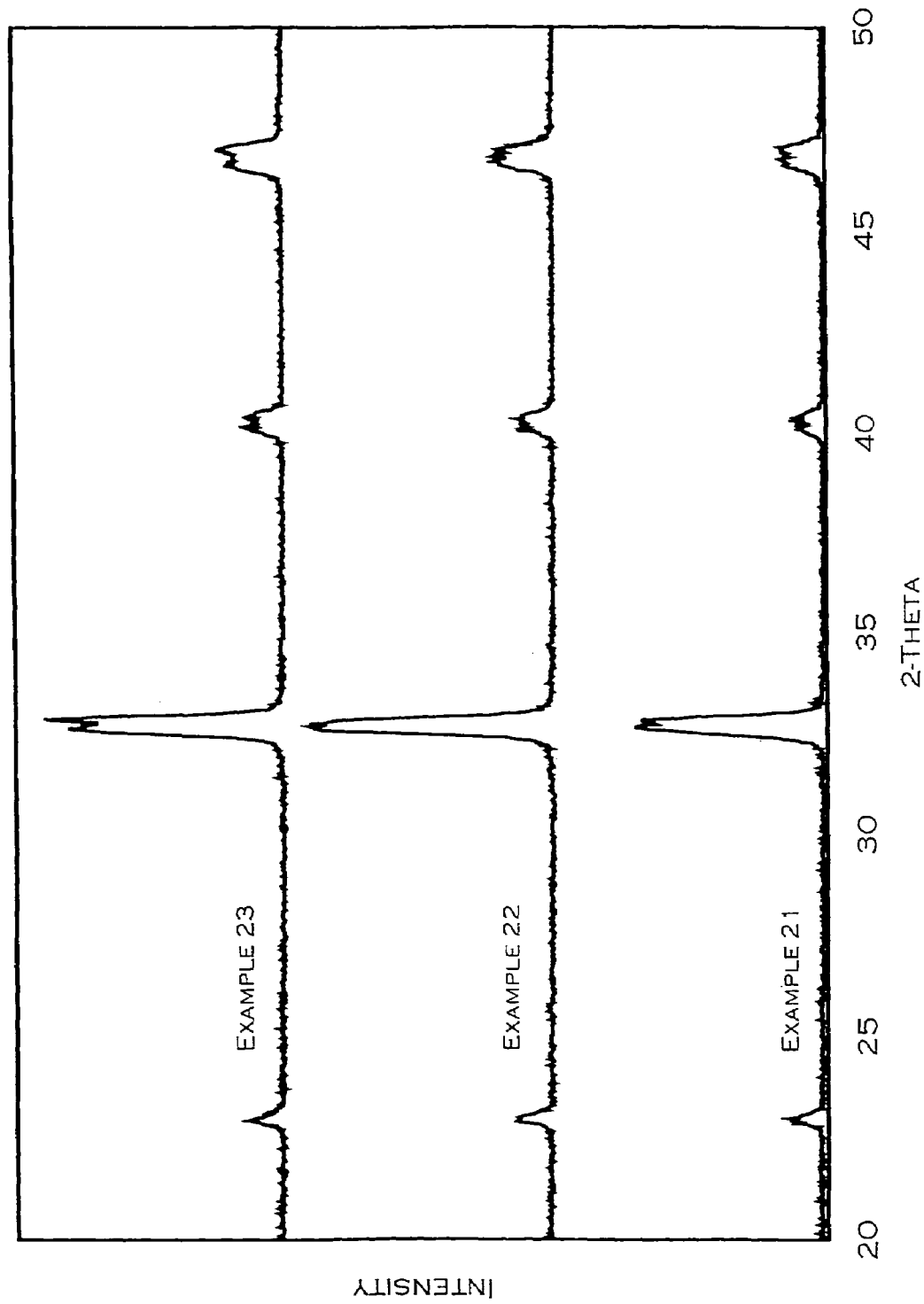
FIG. 7 is an x-ray diffraction pattern of the calcined perovskite electrode powders of Examples 21, 22, and 23.

463.41 of $La_2(CO_3)_3$, 132.92 g of $SrCO_3$, 165.57 g of $Fe_2O_3$, 8.06 g of $Cu_2O$ and 14.66 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1000° C. calcination for four hours was sufficient to allow the formation of the perovskite structure shown in FIG. 7. The remaining attrition milled mixture was calcined at 1000° C. for eight hours to assure reaction was complete. The resulting powder was attrition milled a final time for 3 hours to achieve a measured surface area of 3.634 $m^2/g$, and was sieved through a 100-mesh screen prior to storage.

Figure 14:
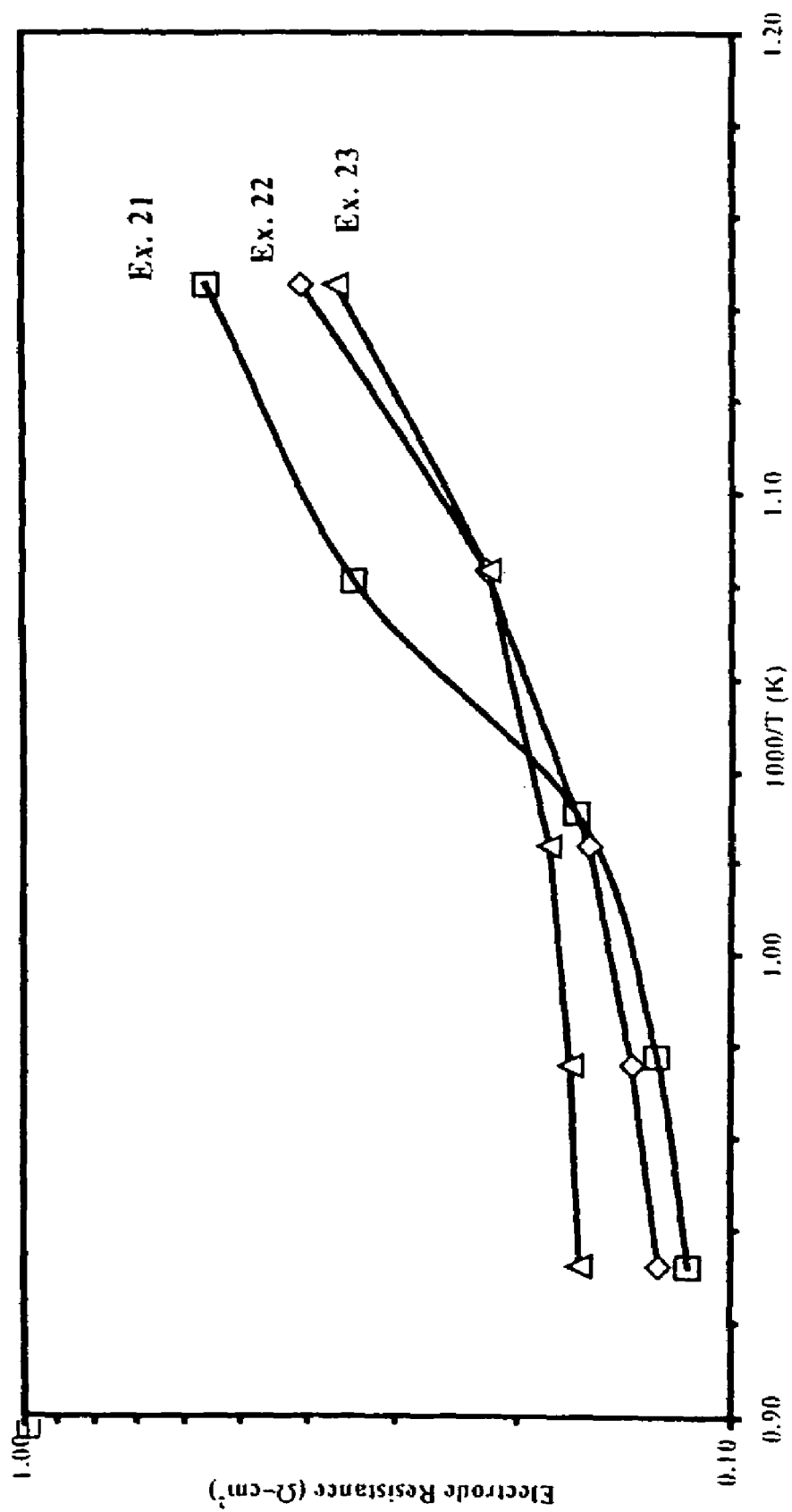
FIG. 14 is a graph of the interfacial resistance of the perovskite electrodes of Examples 21, 22, and 23 versus the reciprocal temperatures, measured with symmetrical electrodes on GDC electrolyte discs.

A screen printing ink was prepared by mixing 30.05 g of the calcined powder and 17.74 g of a commercial terpineol ink vehicle using a three roll mill. The resulting ink was screen printed onto both sides of a GDC disc in a 1.27 cm diameter disc pattern. The symmetrically electroded disc was fired at 1000° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 14.

EXAMPLE 22

463.22 of $La_2(CO_3)_3$, 132.59 g of $SrCO_3$, 165.50 g of $Fe_2O_3$, 32.41 g of $Zn(NO_3)_2$, and 14.66 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 7. The remaining attrition milled mixture was calcined at 1100° C. for eight hours to assure reaction was complete. The resulting powder was attrition milled a final time for 3 hours to achieve a measured surface area of 3.615 $m^2/g$, and was sieved through a 100-mesh screen prior to storage. Interfacial resistance values for a disc sample prepared by applying the resulting powder as a printing ink are plotted in FIG. 14.

EXAMPLE 23

462.72 of $La_2(CO_3)_3$, 132.72 g of $SrCO_3$, 165.32 g of $Fe_2O_3$, 32.37 g of $Zn(NO_3)_2$, and 8.05 g of $Cu_2O$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. Three 20-gram samples of the attrition milled powder were calcined for four hours at 1000° C., 1100° C., and 1200° C., respectively. The resulting calcined powders were ground and sieved through a 200-mesh screen prior to x-ray diffraction analysis at 2°/min from 20° to 50° 2 theta, using a CuKα x-ray source. Evaluation of the x-ray diffraction data showed that 1100° C. calcination for four hours was sufficient to allow the formation of the perovskite structure shown in FIG. 7. The remaining attrition milled mixture was calcined at 1100° C. for eight hours to assure reaction was complete. The resulting powder was attrition milled a final time for 3 hours to achieve a measured surface area of 5.044 $m^2/g$, and was sieved through a 100-mesh screen prior to storage. Interfacial resistance values for a disc sample prepared by applying the resulting powder as a printing ink are plotted in FIG. 14.

EXAMPLE 24

Figure 8:
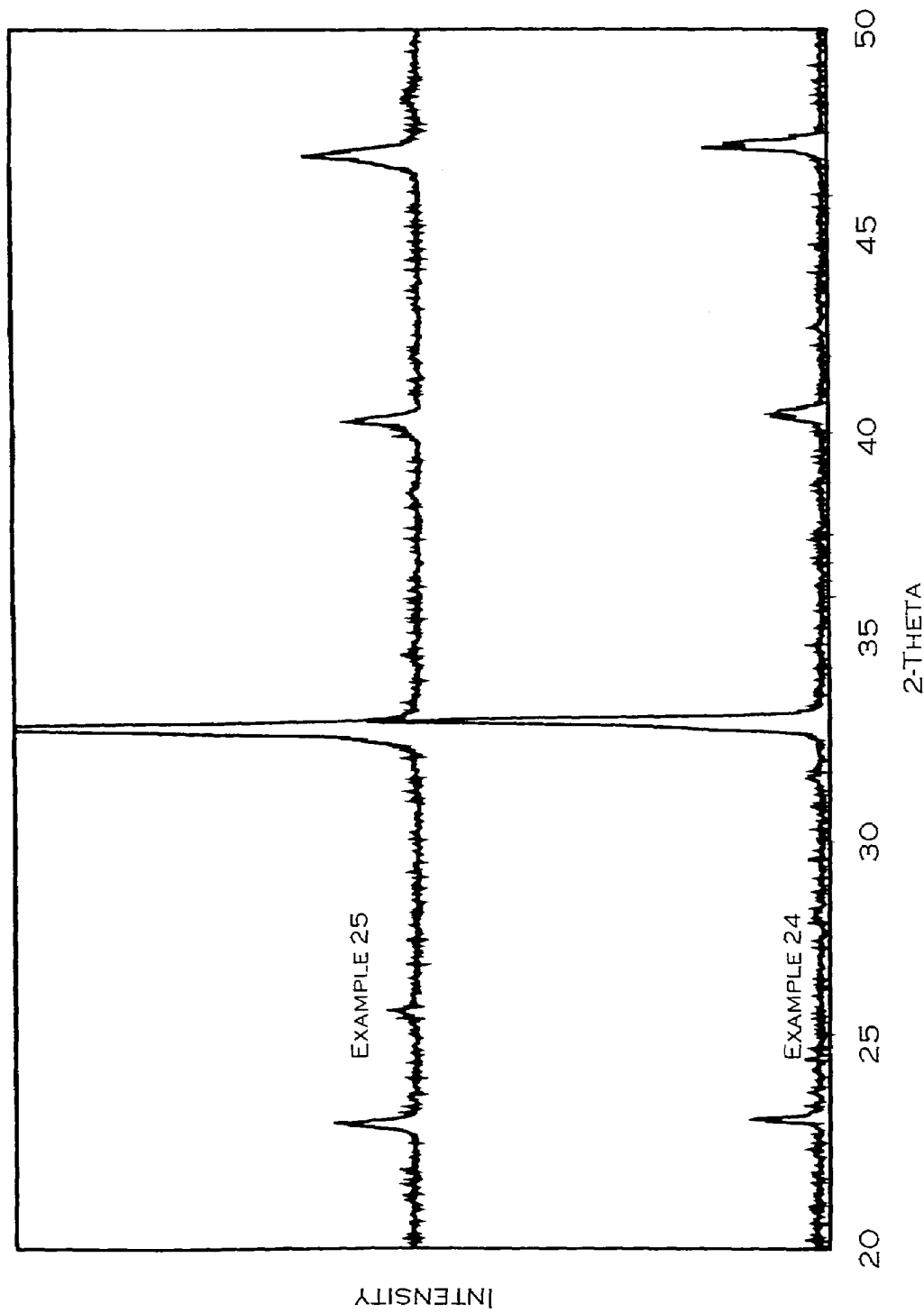
FIG. 8 is an x-ray diffraction pattern of the calcined perovskite electrode powders of Examples 24 and 25.

348.09 of $Pr_6(CO_3)_{11}$, 105.99 g of $SrCO_3$, 117.08 g of $Fe_2O_3$, and 46.65 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. The attrition milled mixture was calcined at 1200° C. for eight hours to complete the perovskite structure shown in FIG. 8. The resulting powder had a measured surface area of 0.732 $m^2/g$, and was sieved through a 100-mesh screen prior to storage.

Figure 15:
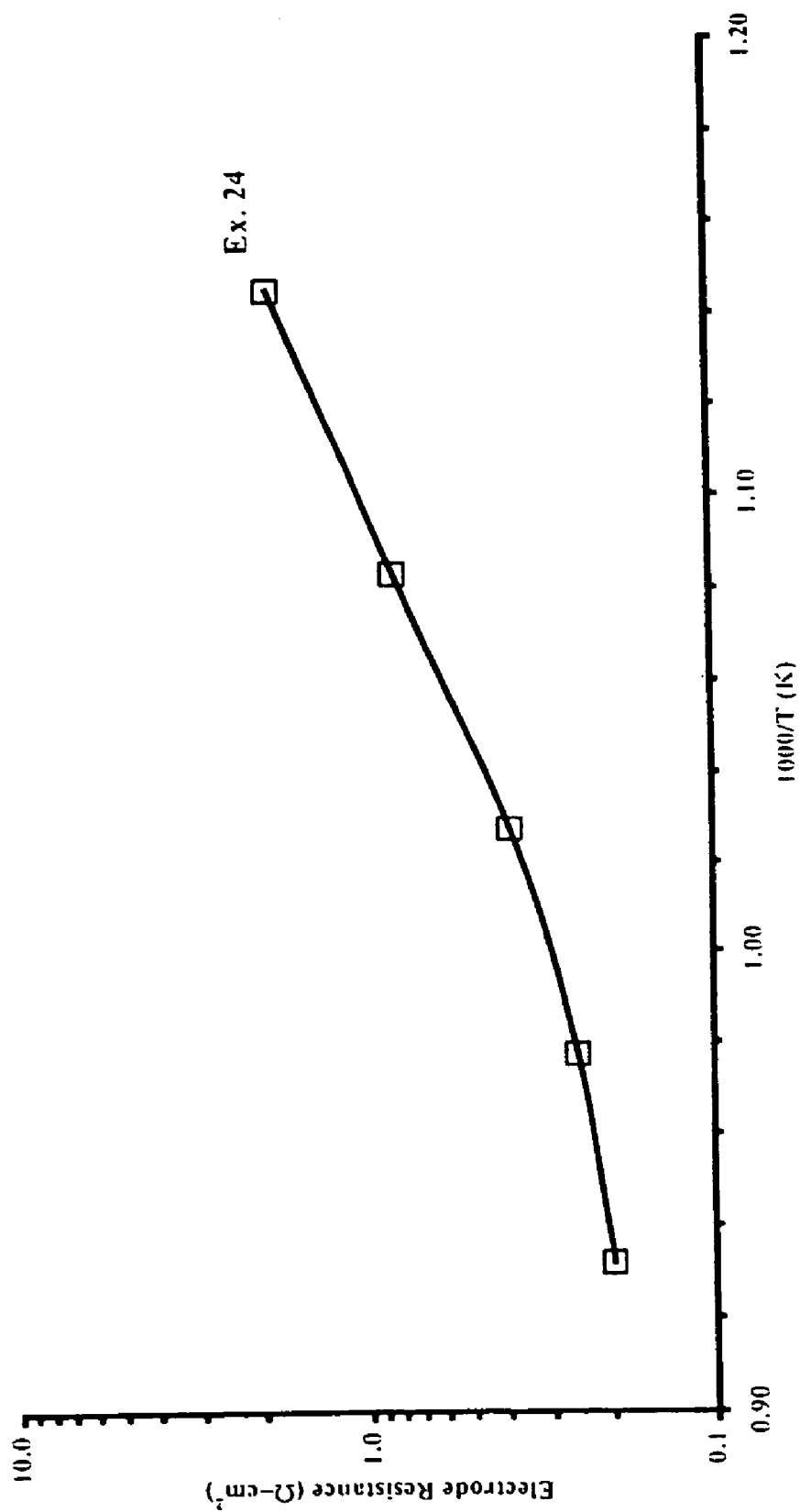
FIG. 15 is a graph of the interfacial resistance of the perovskite electrode of Example 24 versus the reciprocal temperatures, measured with symmetrical electrodes on GDC electrolyte discs.

A screen printing ink was prepared by mixing 9.55 g of the calcined powder and 6.13 g of a commercial terpineol ink vehicle using a three roll mill. The resulting ink was screen printed onto both sides of a GDC disc in a 1.27 cm diameter disc pattern. The symmetrically electroded disc was fired at 1100° C. for 1 hour to achieve adhesion. Adhesion was tested by applying transparent tape and removing the tape; cathode inks that did not peel off the GDC disc were considered adhered. Silver electrodes were applied to each cathode and a silver wire was attached to the wet ink. The sample was then heated to 250° C. for 30 minutes to adhere the silver lead. The sample was then placed into a tube furnace and the silver leads attached to a digital multimeter. The resistance of the symmetric cell was measured every 50° C. from 600° C. to 800° C. to produce a curve of total resistance versus temperature. Based on previous measurements of GDC conductivity, the resistance of the disc sample was calculated for the area between the electrodes, and subtracted from the total resistance to arrive at the interfacial resistance values plotted in FIG. 15.

EXAMPLE 25

348.09 of $Pr_6(CO_3)_{11}$, 105.99 g of $SrCO_3$, 117.08 g of $Fe_2O_3$, and 46.65 g of $Ni_2(CO_3)_3$ were weighed into a one-liter bottle and mixed for one hour by dry milling. The resulting mixture was attrition milled for three hours in IPA, then dried in ambient conditions before being sieved through a 60-mesh screen. The resulting powder was then calcined at 800° C. for eight hours to decompose the carbonate precursors. The calcined powder was attrition milled for 3 hours. The attrition milled mixture was calcined at 1200° C. for eight hours to complete the perovskite structure shown in FIG. 8. The resulting powder had a measured surface area of 0.732 $m^2/g$, and was sieved through a 100-mesh screen prior to storage.

EXAMPLE 26

Figure 16A:
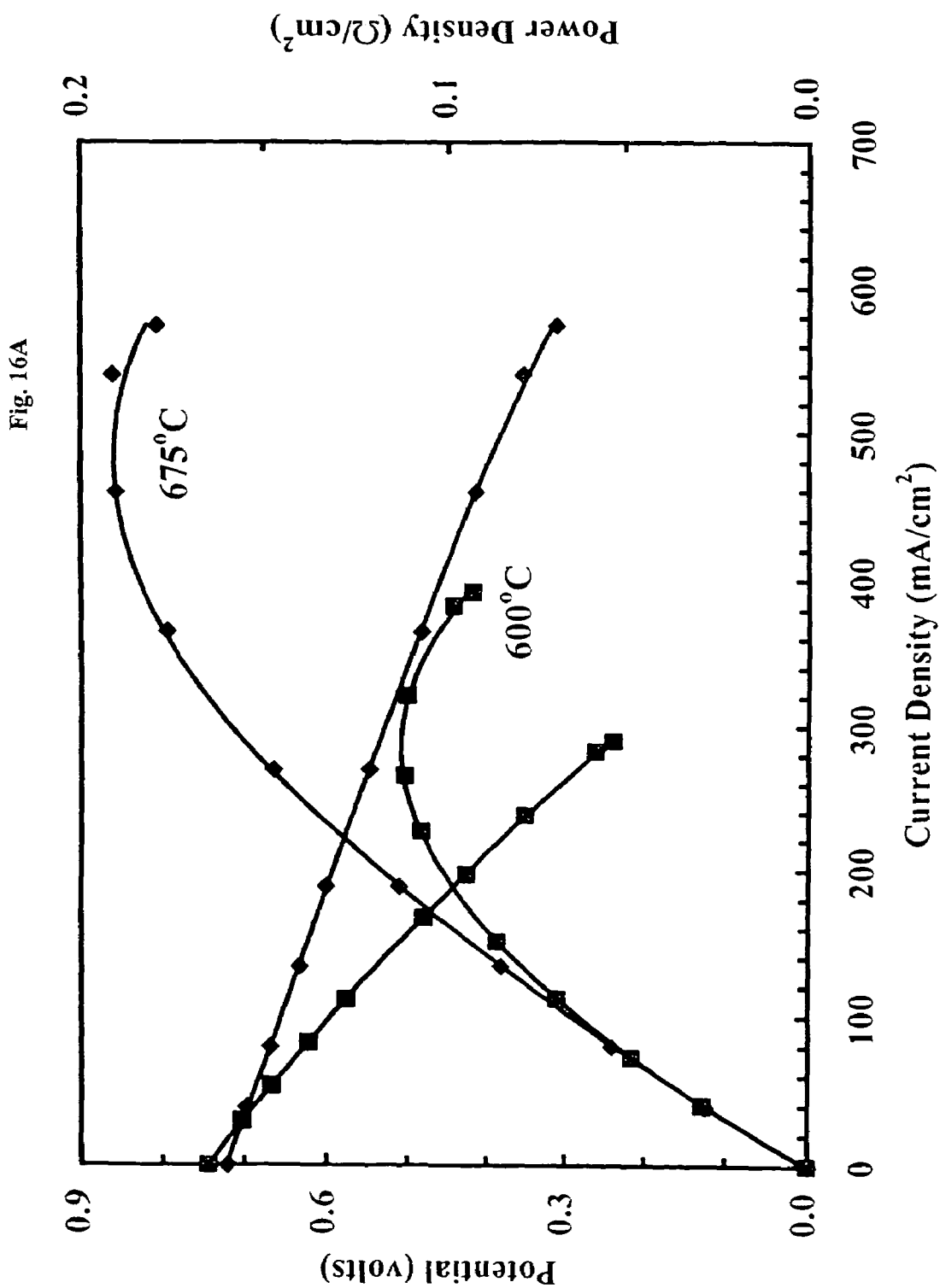
FIG. 16A is a graph of the solid oxide fuel cell performance data obtained on anode supported thin film ceria SOFCs with a conventional LSF cathode. The graph shows the current density versus the potential (left side) and the power density (right side) at 600 and 675° C.
Figure 16B:
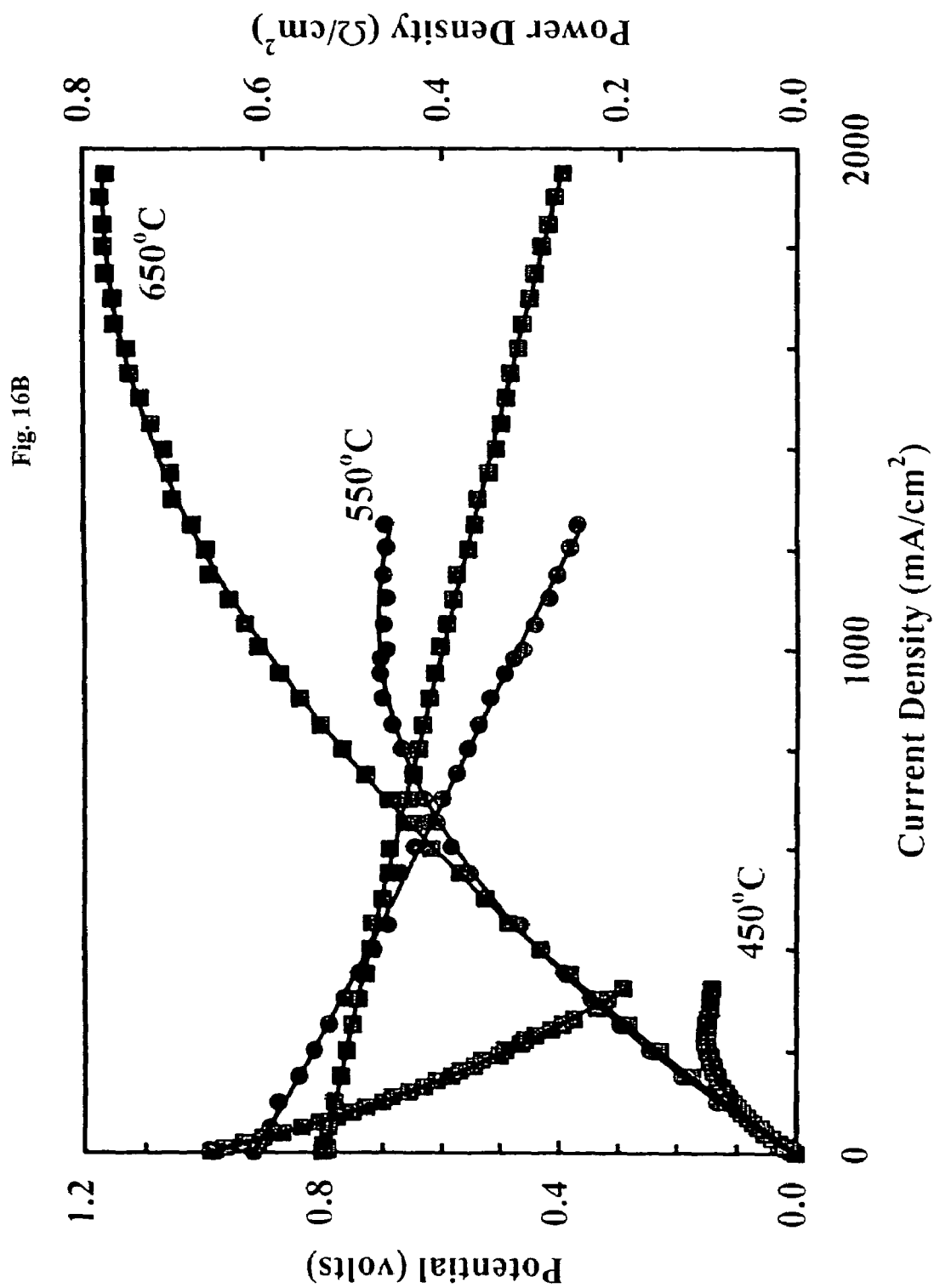
FIG. 16B is a graph of the solid oxide fuel cell performance data obtained on anode supported thin film ceria SOFCs with the cathode of Example 2. The graph shows the current density versus the potential (left side) and the power density (right side) at 450, 550, and 650° C.

To evaluate the performance of the electrode materials, two anode supported GDC thin film electrolyte cells with a 1 mm thick anode of GDC-47 vol % Ni metal and a GDC electrolyte layer 20 microns thick, were prepared. Cathodes of the cells were applied using screen printing. The cathode for the first cell was a screen printed pad of the cathode ink prepared as described in Example 2. The cathode ink was applied in a disc 1.27 cm in diameter. A second cell was prepared using a commercially available LSF screen printing ink. The commercial ink was applied in a disc 1.27 cm in diameter. The cathode materials were adhered by calcining the cells at 1200° C. for 1 hour for the cathode from Example 2, and at 975° C. for the LSF cathode. The two cells were tested using flowing hydrogen fuel stream of $H_2$/3% $H_2O$ on the anode side, and ambient air on the cathode side. FIG. 16A graphically depicts the performance of the cell with the conventional LSF cathode and FIG. 16B graphically depicts the performance of the cell with the cathode of Example 2. As shown in FIGS. 16A and B, the performance of the cathode of Example 2 is markedly superior that of the commercial LSF cathode, as would be expected from the low interfacial resistance of the cathode of the present invention.

Throughout this specification, when a range of conditions or a group of substances is defined with respect to a particular characteristic (e.g., temperature, volume percent, and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly with respect to any subranges or subgroups therein.

Although specific embodiments of the invention have been described herein in detail, it is understood that variations may be made thereto by those skilled in the art without departing from the spirit of the invention or the scope of the appended claims. In particular, the presence in the ceramic electrode material of incidental amounts of particles having a size or surface area outside a specified range does not destroy the utility of the invention. Mixtures containing predominantly ceramic electrode constituent particles of the specified range(s) and incidental amounts of ceramic electrode constituent particles outside the specified range(s) are considered to be within the scope of the invention.

What is claimed is:

1. A ceramic electrode material in powdered form, the material having a perovskite structure and a composition that satisfies the formula $(A_{1-x}A'_x)_{1-z}(B_{1-y}B'_y)O_{3-\delta}$, where
    A is selected from a lanthanide element, bismuth, a trivalent cation having an ionic radius between 0.8 and 1.4 Å, and mixtures thereof;
    A' is selected from an alkaline earth element, lead, a divalent cation having an ionic radius between 0.4 and 0.9 Å, and mixtures thereof;
    B is selected from Al, Ga, Sn, a transition element other than Cu, Ni, or Zn, and mixtures thereof;
    B' is selected from a mixture of Mg and at least one of Cu and Ni; a mixture of Zn and at least one of Cu and Ni; and a mixture of Mg, Zn, and at least one of Cu and Ni;
    x is less than or equal to 0.5;
    z is less than or equal to 0.20; and
    y is greater than 0 and less than 0.20.

2. A ceramic electrode material, comprising:
    a physical mixture of a majority and at least one minority ceramic electrode material component, the majority component being the ceramic electrode material of claim 1.

3. The ceramic electrode material of claim 1, wherein B is selected from Al, Ga, Sn, a transition element other than Co, Mn, Cu, Ni, or Zn, and mixtures thereof and B' is selected from Co and a mixture of Co and Ni.

4. The ceramic electrode material of claim 1, wherein B is selected from Fe, Al, Ga, and mixtures thereof.

5. A cathode of a solid oxide fuel cell, comprising:
    the ceramic electrode material of claim 1.

6. An electrode of a ceramic oxygen generation system, comprising:
the ceramic electrode material of claim 1.

7. A method of making a ceramic electrode material, comprising the steps of:
providing a electrolyte powder;
providing a ceramic electrode powder having a perovskite structure and a composition that satisfies the formula $(A_{1-x}A'_x)_{1-z}(B_{1-y}B'_y)O_{3-\delta}$, where
A is selected from a lanthanide element, bismuth, a trivalent cation having an ionic radius between 0.8 and 1.4 Å, and mixtures thereof;
A' is selected from an alkaline earth element, lead, a divalent cation having an ionic radius between 0.4 and 0.9 Å, and mixtures thereof;
B is selected from Al, Ga, Sn, a transition element other than Cu, Ni, or Zn, and mixtures thereof;
B' is selected from a mixture of Mg and at least one of Cu and Ni; a mixture of Zn and at least one of Cu and Ni; and a mixture of Mg, Zn, and at least one of Cu and Ni;
x is less than or equal to 0.5;
z is less than or equal to 0.20; and
y is greater than 0 and less than 0.20;
mixing the electrolyte powder with the electrode powder by a mixing method selected from attrition milling and ball milling; and
calcining the milled powder mixture.

8. The method of claim 7, wherein the electrolyte powder has a surface area $\geq 20$ m$^2$/gram.

9. The method of claim 8, wherein the electrolyte powder has a surface area $\geq 50$ m$^2$/gram.

10. The method of claim 9, wherein the electrolyte powder has a surface area $\geq 100$ m$^2$/gram.

11. The method of claim 7, further comprising the step of:
calcining the electrolyte powder.

12. The method of claim 7, wherein the mixing step includes the steps of milling the electrolyte power and the electrode powder in the presence of a surfactant; drying the milled powder mixture; and sieving the milled powder mixture.

13. The method of claim 7, wherein the electrolyte powder is selected from yttrium-stabilized zirconia, a doped ceria electrolyte material, barium zirconate, scandium-doped zirconia, a lanthanum gallate based ceramic electrolyte material, a bismuth oxide based electrolyte material, and mixtures thereof.

14. The method of claim 7, wherein the electrolyte power comprises about 1 to 50 volume percent of the electrode powder.

15. A ceramic electrode material in powdered form, the material having a perovskite structure and a composition that satisfies the formula $(A_{1-x}A'_x)_{1-z}(B_{1-y}B'_y)O_{3-\delta}$, where
A is selected from a lanthanide element, bismuth, a trivalent cation having an ionic radius between 0.8 and 1.4 Å, and mixtures thereof;
A' is selected from an alkaline earth element, lead, a divalent cation having an ionic radius between 0.4 and 0.9 Å, and mixtures thereof;
B is Fe;
B' is selected from Zn, Cu, a mixture of Zn and Cu, and a mixture of Ni and at least one of Zn and Cu;
x is less than or equal to 0.5;
z is less than or equal to 0.20; and
y is greater than 0 and less than 0.20.

16. A ceramic electrode material in powdered form, the material having a perovskite structure and a composition that satisfies the formula $(A_{1-x}A'_x)_{1-z}(B_{1-y}B'_y)O_{3-\delta}$, where
A is selected from a lanthanide element, bismuth, a trivalent cation having an ionic radius between 0.8 and 1.4 Å, and mixtures thereof;
A' is selected from an alkaline earth element, lead, a divalent cation having an ionic radius between 0.4 and 0.9 Å, and mixtures thereof;
B is Fe;
B' is selected from Ni, Zn, Cu, and mixtures thereof;
x is greater than 0 and less than or equal to 0.5;
z is less than or equal to 0.20; and
y is greater than 0 and less than 0.20.

* * * * *